United States Patent
Kato et al.

(10) Patent No.: US 7,572,529 B2
(45) Date of Patent: Aug. 11, 2009

(54) METHOD AND SYSTEM FOR STARTING UP FUEL CELL STACK AT SUBZERO TEMPERATURES, AND METHOD OF DESIGNING FUEL CELL STACK

(75) Inventors: Hideo Kato, Utsunomiya (JP); Shigeru Inai, Shioya-gun (JP); Katsumi Hayashi, Utsunomiya (JP); Ryo Jinba, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 805 days.

(21) Appl. No.: 10/935,809

(22) Filed: Sep. 7, 2004

(65) Prior Publication Data
US 2005/0053810 A1    Mar. 10, 2005

(30) Foreign Application Priority Data
Sep. 8, 2003    (JP)    ............... 2003-315725

(51) Int. Cl.
*H01M 8/00* (2006.01)
*H01M 8/04* (2006.01)
*H01M 8/12* (2006.01)
*H01M 2/14* (2006.01)

(52) U.S. Cl. ............... 429/13; 429/24; 429/38
(58) Field of Classification Search .............. 429/24, 429/13, 38
See application file for complete search history.

(56) References Cited

U.S. PATENT DOCUMENTS

| | | | | |
|---|---|---|---|---|
| 4,956,131 | A * | 9/1990 | Shigeta et al. | 264/29.5 |
| 6,087,028 | A * | 7/2000 | Goto | 429/24 |
| 6,503,653 | B2 * | 1/2003 | Rock | 429/35 |
| 6,777,115 | B2 * | 8/2004 | Reiser | 429/13 |
| 6,858,338 | B2 * | 2/2005 | Sugiura et al. | 429/32 |
| 6,974,648 | B2 * | 12/2005 | Goebel | 429/34 |
| 2002/0081467 | A1 | 6/2002 | Luft et al. | |
| 2002/0150809 | A1 * | 10/2002 | Hammerschmidt et al. | 429/34 |

FOREIGN PATENT DOCUMENTS

| | | |
|---|---|---|
| JP | 58-165271 | 9/1983 |
| JP | 2000-208153 | 7/2000 |

(Continued)

OTHER PUBLICATIONS

Canadian Office Action for Application No. 2,480,375, dated Apr. 4, 2007.

(Continued)

*Primary Examiner*—Patrick Ryan
*Assistant Examiner*—Julian Mercado
(74) *Attorney, Agent, or Firm*—Lahive & Cockfield, LLP; Anthony A. Laurentano

(57) ABSTRACT

A method of starting up at a subzero temperature a solid polymer electrolyte fuel cell stack that is formed by stacking a plurality of layers of separators and membrane electrode assemblies having a solid polymer electrolyte membrane and electrodes. The method includes a step of using a solid polymer electrolyte fuel cell stack in which the separators are made from metal and have a cross-sectional waveform structure, and a space that is formed between at least a portion of the separators and separators that are placed adjacent to this portion of the separators is used as a coolant flow passage.

23 Claims, 23 Drawing Sheets

FOREIGN PATENT DOCUMENTS

| | | |
|---|---|---|
| JP | 2000-512068 | 9/2000 |
| JP | 2000-324617 | 11/2000 |
| JP | 2002-134150 | 5/2002 |
| JP | 2002-246052 | 8/2002 |
| JP | 2003-257460 | 9/2003 |
| WO | WO-97/48142 | 12/1997 |

OTHER PUBLICATIONS

Japanese Office Action for Application No. 2003-315725, dated Jul. 3, 2007.

* cited by examiner

FIG. 23
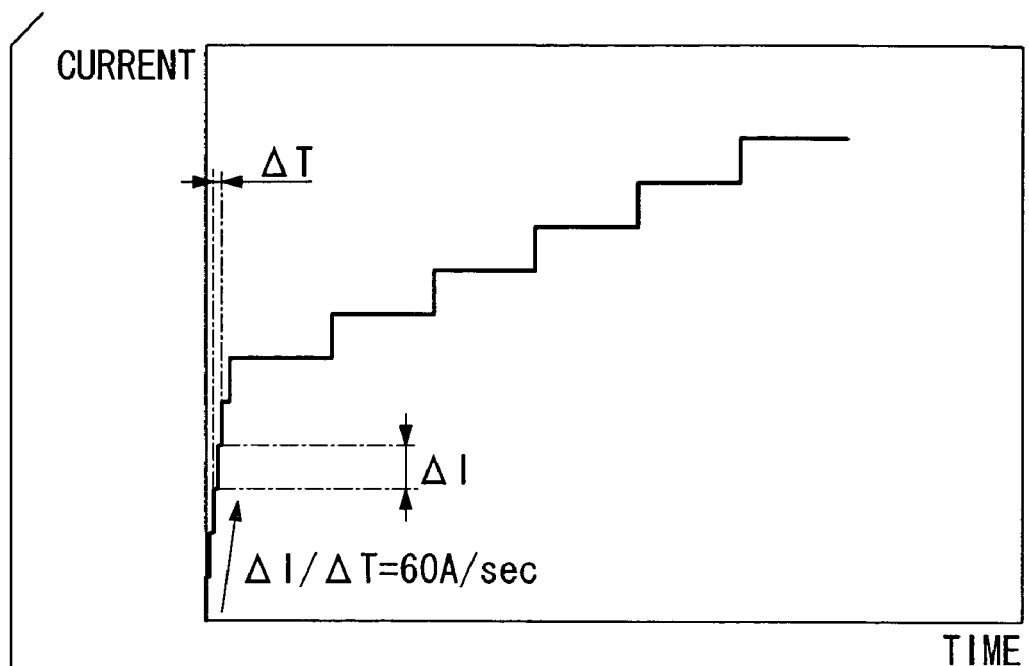
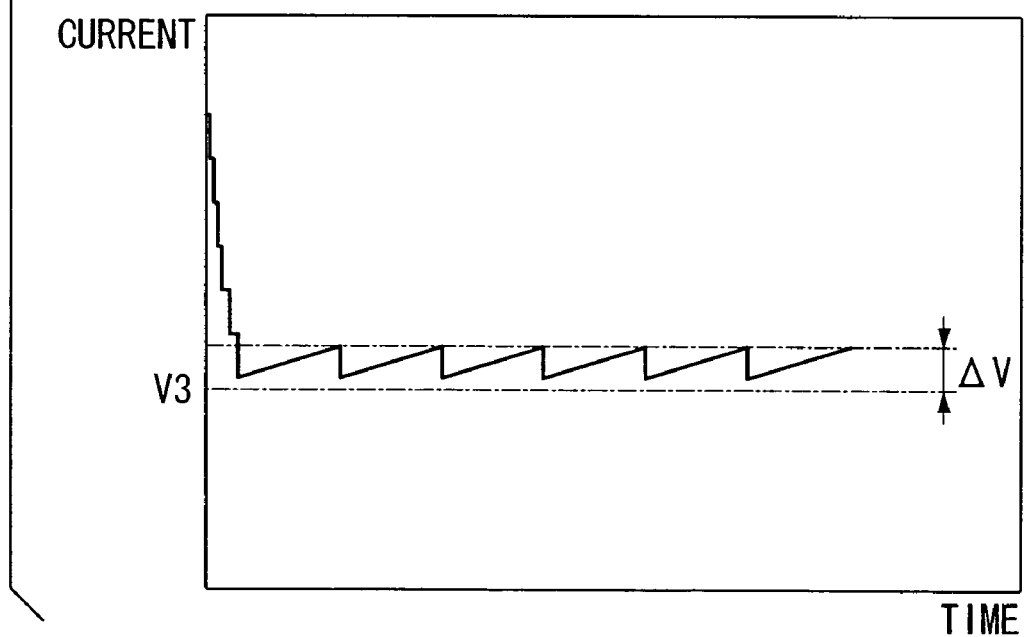

METHOD AND SYSTEM FOR STARTING UP FUEL CELL STACK AT SUBZERO TEMPERATURES, AND METHOD OF DESIGNING FUEL CELL STACK

BACKGROUND OF THE INVENTION

1. Field of the Invention

Priority is claimed on Japanese Patent Application No. 2003-315725, filed Sep. 8, 2003, the content of which are incorporated herein by reference.

The present invention relates to a method for starting up a fuel cell stack at subzero temperatures, relates to a system for starting up a fuel cell stack at subzero temperatures, and relates to a method of designing a fuel cell stack.

2. Description of Related Art

Among the fuel cells, there are those in which a solid polymer electrolyte membrane is sandwiched between an anode electrode and a cathode electrode so as to form a membrane electrode assembly. This membrane electrode assembly is further sandwiched between a pair of separators so as to form a single cell (i.e., a fuel cell unit). In this type of fuel cell, typically, a plurality of single cells are stacked and used as a fuel cell stack.

In this fuel cell, a chemical reaction is caused by supplying a fuel gas (e.g., hydrogen gas) to a power generating surface of the anode electrode and by supplying an oxidizing gas (e.g., air that contains oxygen) to a power generating surface of the cathode. The electrons that are generated between these two are then removed to an external circuit and are used as DC electrical energy. As a result of oxidizing gas (e.g., air containing oxygen) being supplied to the cathode electrode, hydrogen ions, electrons, and oxygen react at the cathode electrode and water is created. In this manner, because fuel cells have a minimal effect on the environment, they have attracted attention as driving sources for vehicles.

Moreover, typically, the operating temperature of this type of fuel cell is approximately 70° C. to 80° C., and temperature control is conducted by supplying coolant to coolant flow passages that are provided in the separators such that the fuel cell does not exceed this operating temperature due to the heat that is created when power is generated.

In this type of fuel cell, because the power generating efficiency is deteriorated at low temperatures, startability at low temperatures causes considerable problems. Accordingly, when the fuel cell is used in a vehicle, if an attempt is made to start up the fuel cell when the outside temperature is low, for example, is a subzero temperature, the problem arises in that a considerable time is required before startup is achieved.

As a measure of countering low temperatures, as is disclosed, for example, in Published Japanese Translation No. 2000-512068 of the PCT International Application, the reaction is accelerated by supplying power to the external load of the fuel cell, so that the temperature is raised by self-generated heat and the startability is improved.

If a fuel cell stack is warmed up by its own self-generated heat in this manner, there is a method in which the heat generation is accelerated by supplying a large current to the fuel cell stack in order to shorten the warm-up time.

However, if a shortening of the warm-up time is achieved and the output current is increased, then at the same time as the quantity of generated heat increases, the quantity of water that is generated inside the cells as power is generated also increases. As a result of this generated water freezing inside diffusion electrode layers and catalytic layers, the problem arises in that the reaction gas is unable to reach the solid polymer electrolyte membrane, thereby inviting an abrupt voltage drop and, ultimately, hastening a drop in voltage.

Namely, regardless of how much the output current is increased, if the freezing of the generated water is more rapid than the increase in temperature provided by the self-generated heat, the fuel cell stack ends up becoming unable to generate power due to the water generated inside the cells freezing before the temperature is increased, resulting in the objective not being achieved.

Moreover, regardless of what attempts are made to increase the output current, the maximum current density that can be output in the membrane electrode assemblies that form the fuel cell is decided in accordance with the temperature, and more current than this cannot be supplied.

In addition, if water generated in the diffusion electrode layer and catalytic layer freezes and there is a failure in the startup, it is extremely difficult to once again conduct a startup operation. Generally, when a fuel cell is stopped, a purge is made by supplying gas or the like, so that generated water is not left in the diffusion electrode layer and the like. Accordingly, by supplying reaction gas to the fuel cell stack at the time of an initial startup even at a subzero temperature, it is possible to extract power temporarily from the fuel cell stack. However, once the holes in the diffusion electrode layer and catalytic layer have been blocked by the freezing of the generated water so that the reaction gas is unable to pass therethrough, even if reaction gas is supplied to the fuel cell stack, the reaction gas cannot reach the solid polymer electrolyte membrane and power cannot be obtained from the fuel cell stack. If power cannot be obtained from the fuel cell stack, then it is not possible for the fuel cell stack to be warmed up by self-generated heat. Accordingly, when starting up a fuel cell stack at a subzero temperature, the initial startup operation is extremely important. If there is a failure in the warm-up in the initial startup operation, then, in some cases, the fuel cell stack enters a state in which is it is unable to be restarted.

It is an aim of the present invention to provide a method for starting up a fuel cell stack at a subzero temperature and a system for starting up a fuel cell stack at a subzero temperature that enable warming up to be conducted rapidly before a drop in voltage is generated as a result of the freezing of generated water, and to provide a method for designing a fuel cell stack that is suitable for this subzero temperature startup method and subzero temperature startup system.

SUMMARY OF THE INVENTION

In order to solve the problems described above, the present invention provides a method of starting up at a subzero temperature a solid polymer electrolyte fuel cell stack that is formed by stacking a plurality of layers of separators and membrane electrode assemblies having a solid polymer electrolyte membrane and electrodes, the method including: using a solid polymer electrolyte fuel cell stack in which the separators are made from metal and have a cross-sectional waveform structure, and a space that is formed between at least a portion of the separators and separators that are placed adjacent to this portion of the separators is used as a coolant flow passage.

According to this start-up method, because the heat capacity of separators that are made from metal is small, the fuel cell stack warms up easily and it is possible to shorten the warm-up time of a subzero start-up.

Here, the term "cross-sectional waveform structure" refers to a structure in which concave portions and convex portions correspond to the front and rear of the separators, as in the case when a metal plate is formed by press working. If concave portions and convex portions correspond to the front and rear of the separators, then the cross-sectional configuration is not limited to the form of a curved line, and rectangles that are bent at substantially right angles may also be employed.

Furthermore, the present invention provides is a method of starting up at a subzero temperature a solid polymer electrolyte fuel cell stack that is formed by stacking a plurality of layers of metal separators that have a cross-sectional waveform structure and membrane electrode assemblies having a solid polymer electrolyte membrane and electrodes, and in which a space that is formed between at least a portion of the separators and separators that are placed adjacent to this portion of the separators is used as a coolant flow passage, the method including: setting a heat capacity of the fuel cell stack to a predetermined value based on a preset start-up commencement temperature and on characteristics of the membrane electrode assemblies such that a temperature of the membrane electrode assemblies is raised to 0° C. or more before the membrane electrode assemblies become unable to generate power when a temperature of the fuel cell stack is raised using self-generated heat that is created as a result of the fuel cell stack generating power; using the fuel cell stack whose heat capacity has been set to the predetermined value; and controlling an output from the fuel cell stack such that an output current from the fuel cell stack becomes equal to or greater than a minimum necessary current that is required to compensate for discharged heat.

Conventionally, carbon separators and metal separators have been used for the separators that are used in fuel cell stacks. Because the coolant flow passages in carbon separators are provided by a machining process or by a molding process, even if the reaction gas flow passages and the coolant flow passages are provided on the front and rear of the separators, it is possible to form the coolant flow passages without having to consider the reaction gas flow passages. Accordingly, in the case of carbon separators, because it is possible to provide the necessary minimum of coolant flow passages to suit the cooling performance, the effects of the heat capacity of the coolant on the characteristics of the warm-up during start-up are small. However, in the case of carbon separators, the fact that carbon material has a large specific heat and the fact that the thickness of separators made from carbon is comparatively thick go together to create the problem in that the heat capacity of the separators themselves is large.

In contrast, because separators made from metal have a small heat capacity, they have excellent characteristics when warm-up is performed from a subzero temperature.

When starting up a fuel cell stack from a subzero temperature, from the viewpoint of the rate of temperature increase, the smaller the heat capacity of the fuel cell stack the more desirable this is. However, because metal separators are formed by press working, the configuration of coolant flow passages that are provided in one side of a separator corresponds to the configuration of reaction gas flow passages that are provided on the opposite side thereof. Accordingly, if a coolant flow passage configuration is designed such that the coolant heat capacity is small, the problem arises in that this affects the reaction gas flow passage configuration on the rear side.

The present inventors performed repeated experiments and found that a fixed relationship exists between a limited time for start-up prior to air holes in diffusion electrode layers and catalytic layers becoming blocked by the freezing of generated water, the quantity of heat generated by fuel cell power generation, the quantity of heat discharged to the outside from the fuel cell, and the heat capacity of the fuel cell stack. Based on these interrelationships, the present inventors completed the present invention.

Based on a preset start-up commencement temperature and on characteristics of the membrane electrode assemblies, the present inventors set a heat capacity that did not allow the fuel cell stack to degenerate into a state in which it was unable to start up again. If a stack having a heat capacity that was smaller than the maximum heat capacity required for a successful start-up was used, this was effective from the viewpoint of the rate of temperature increase, however, the heat capacity of the coolant was made excessively small, thereby restricting the degree of freedom when designing the reaction gas flow passages and, consequently, also affecting the performance in normal operation after warm-up was completed. In contrast, if the heat capacity of the stack exceeded the maximum heat capacity, the stack degenerated into a state in which it was unable to generate power, and was also unable to be restarted.

Namely, the present invention provides a subzero temperature start-up method that avoids those states in which restarting is impossible into which a stack has tended to degenerate during a subzero temperature start-up, and that allows the degree of freedom when designing reaction gas flow passages to be kept at a maximum.

In the above described start-up method, it is preferable if the predetermined value is 0.04 to 0.33 J/K·cm² per unit area per single cell in a three-dimensional volume in which the electrode portions can be superposed in a stacking direction.

Here, the term "per single cell" refers to dividing the heat capacity of a three-dimensional volume obtained by stacking electrode portions in the stacking direction by the number of layers of the membrane electrode composite body. The heat capacity per single cell that is thereby obtained is then further divided by the surface area of the electrode portion so as to give the above numerical value.

By using a fuel cell stack in which the heat capacity per unit area per single cell is 0.04 to 0.33 J/K·cm² in a three-dimensional volume obtained by stacking electrode portions in the stacking direction, it is possible to reliably avoid a state in which restarting is impossible and into which a stack can degenerate during a subzero temperature start-up.

The present invention further provides a method of starting up at a subzero temperature a solid polymer electrolyte fuel cell stack that is formed by stacking a plurality of layers of metal separators that have a cross-sectional waveform structure and membrane electrode assemblies having a solid polymer electrolyte membrane and electrodes, and in which a space that is formed between at least a portion of the separators and separators that are placed adjacent to this portion of the separators is used as a coolant flow passage, the method including: starting up the fuel cell stack in a state in which there is no coolant in the coolant flow passages; and controlling an output from the fuel cell stack such that an output current from the fuel cell stack becomes equal to or greater than a minimum necessary current that is required to compensate for discharged heat.

By using metal separators and by also removing coolant during a subzero temperature start-up, the heat capacity of the fuel cell stack rapidly decreases.

In the case of carbon separators, because the coolant flow passages are formed by a machining process or by a molding process, the coolant flow passages are formed comparatively small. As a result, in carbon separators, the heat capacity reduction effect in the fuel cell stack is small even if the coolant is removed. In contrast to this, if metal separators that have a cross-sectional waveform structure and are formed by press working are used, because the heat capacity of the separators themselves is naturally small, and because large size coolant flow passages can be provided due to the cross-sectional waveform structure so that the heat capacity of the coolant has a considerable effect, by removing the coolant, the heat capacity of the fuel cell stack can be rapidly decreased.

Accordingly, by employing the above described structure, the rate of temperature increase in the membrane electrode composite body during a subzero temperature start-up becomes remarkably fast. Moreover, it is possible to prevent the fuel cell stack from degenerating into a state in which it is unable to be restarted as a result of the freezing of generated water, and power generation by the fuel cell stack can be continuously maintained.

In the above described start-up method, it is preferable if control is performed such that an output voltage from the fuel cell stack is maintained at a predetermined value.

There is a difference in the rate of temperature increase that is due to the difference in heat capacity between a case in which the output current from the fuel cell is maintained at a predetermined value, and a case in which the output voltage from the fuel cell is maintained at a predetermined value. By performing control such that the output voltage from the fuel cell is maintained at a predetermined value, and by also reducing the heat capacity of the fuel cell stack, it is possible to markedly hasten the rate of temperature increase of the fuel cell stack and to shorten the warm-up time.

Moreover, the present invention provides a system of starting up a fuel cell stack at a subzero temperature including: a fuel cell stack that is formed by stacking a plurality of layers of metal separators that have a cross-sectional waveform structure and membrane electrode assemblies having a solid polymer electrolyte membrane and electrodes; and a low temperature start-up control device that raises a temperature of the fuel cell stack from a subzero start-up commencement temperature while controlling at least one of a flow rate and pressure of a reaction gas that is introduced into the fuel cell stack, and at least one of an output current and output voltage from the fuel cell stack, wherein the start-up control device including: a temperature measuring device that measures a temperature of the membrane electrode assemblies; a power generating mode determining device that determines whether start-up should be carried out in normal power generating mode or in low temperature start-up power generating mode based on the temperature that has been measured by the temperature measuring device; and a low temperature start-up output control device that, when it is determined by the power generating mode determining device that start-up should be conducted in the low temperature start-up power generating mode, controls outputs from the fuel cell stack such that the output current from the fuel cell stack is equal to or greater than a minimum necessary current that is required to compensate for discharged heat, and wherein when a temperature of the fuel cell stack is raised using self-generated heat that is created as a result of the fuel cell stack generating power, a heat capacity of the fuel cell stack is set, based on a preset start-up commencement temperature and on characteristics of the membrane electrode assemblies, to a predetermined value such that a temperature of the membrane electrode assemblies is raised to 0° C. or more before the membrane electrode assemblies become unable to generate power.

In the above described start-up system, it is preferable if a cross-sectional area of coolant flow passages in the fuel cell stack is smaller than a cross-sectional area of reaction gas flow passages.

By employing this type of structure, it is possible to reduce the amount of coolant that is held inside the fuel cell stack at the time of a subzero start-up, and to reduce the heat capacity of the fuel cell stack.

In the above described start-up system, it is preferable if, in the fuel cell stack, spaces that are formed between the membrane electrode bodies and the separators are used as reaction gas flow passages, a portion of a plurality of spaces that are formed between the separators that have been placed adjacent to each other are used as coolant flow passages, and remaining spaces are used as air layers.

By employing this type of structure, it is possible to reduce the amount of coolant that is held inside the fuel cell stack at the time of a subzero start-up, and to reduce the heat capacity of the fuel cell stack.

In the above described start-up system, it is preferable if the fuel cell stack has first fluid flow passage portions that are formed by stacking a plurality of separators between membrane electrode assemblies that are adjacent to each other, and second fluid flow passage portions that are formed by placing a single separator between membrane electrode assemblies that are adjacent to each other, and in the first fluid flow passage portions and the second fluid flow passage portions spaces that are formed between the membrane electrode assemblies and the separators form reaction gas flow passages, and in the first fluid flow passage portions spaces that are formed between stacked separators form coolant flow passages.

By employing the above described structure, because no coolant flow passage is present in the second fluid flow passage portion, it is possible to reduce the amount of coolant that is held inside the fuel cell stack at the time of a subzero start-up, and to reduce the heat capacity of the fuel cell stack.

The present invention further provides a method of designing a fuel cell stack that is formed by stacking a plurality of layers of membrane electrode assemblies having a solid polymer electrolyte membrane and electrodes, and separators that are placed between adjacent membrane electrode assemblies, the method including: setting a subzero temperature as a start-up commencement temperature; calculating a limited time for start-up in which the membrane electrode assemblies are unable to generate power from the start-up commencement temperature and obtained current; calculating a maximum heat capacity of the fuel cell stack from the start-up commencement temperature and the limited time for start-up; and designing a fuel cell stack such that metal separators are used therein and the fuel cell stack has a lower heat capacity than the maximum heat capacity.

According to the above described design method, it is possible to avoid those states in which restarting is impossible into which a stack has tended to degenerate during a subzero temperature start-up, and to allow the degree of freedom when designing reaction gas flow passages to be kept at a maximum.

According to the method for starting up a fuel stack at a subzero temperature of the present invention, by employing metal separators that have a small heat capacity, it is possible to shorten the warm up time during a subzero temperature start-up.

According to the method for starting up a fuel stack at a subzero temperature of the present invention, because the temperature of the membrane electrode assemblies is raised to 0° C. or more before the membrane electrode assemblies become unable to generate power even when the fuel cell stack is start-up at a subzero temperature, the excellent effect achieved that it is possible to prevent the fuel cell stack from degenerating into a state in which is unable to generate power as a result of the freezing of generated water, and power generation by the fuel cell stack can be continuously maintained. In addition, the excellent effect is achieved that it is possible to keep the degree of freedom when designing reaction gas flow passages at a maximum.

According to the method for starting up a fuel cell stack at a subzero temperature of the present invention, because the heat capacity of the fuel cell stack is remarkably small and the rate of temperature increase of the membrane electrode composites at a subzero temperature start-up is remarkably fast, it is possible to prevent the fuel cell stack from degenerating so that it is unable to restart as a result of the freezing of generated water, and power generation by the fuel cell stack can be continuously maintained.

According to the method for starting up a fuel cell stack at a subzero temperature of the present invention, by performing control such that the output voltage from the fuel cell is maintained at a predetermined value, and by also reducing the heat capacity of the fuel cell stack, the effect is achieved that it is possible to speed up the rate of temperature increase of the fuel cell stack in a subzero temperature start-up and to shorten the warm-up time.

According to the system for starting up a fuel stack at a subzero temperature of the present invention, because the temperature of the membrane electrode assemblies is raised to 0° C. or more before the membrane electrode assemblies become unable to generate power even when the fuel cell stack is start-up at a subzero temperature, the excellent effect achieved that it is possible to prevent the fuel cell stack from degenerating into a state in which is unable to generate power as a result of the freezing of generated water, and power generation by the fuel cell stack can be continuously maintained. In addition, the excellent effect is achieved that it is possible to keep the degree of freedom when designing reaction gas flow passages at a maximum.

According to the system for starting up a fuel stack at a subzero temperature of the present invention, it is possible to reduce the amount of coolant that is held inside the fuel cell stack at the time of a subzero start-up, and to reduce the heat capacity of the fuel cell stack.

According to the system for starting up a fuel stack at a subzero temperature of the present invention, the excellent effect is achieved that it is possible to easily set the heat capacity of the power generating section of the fuel cell stack to a heat capacity such that, in a case in which the temperature of the fuel cell stack is raised by the self-generated heat that accompanies the generation of power by the fuel cell stack, the temperature of the membrane electrode assemblies reaches 0° C. or more before the membrane electrode assemblies become unable to generate power.

BRIEF DESCRIPTION THE DRAWINGS

FIG. 23 is a view showing changes in an output voltage and an output current of a fuel cell stack in the subzero temperature startup control of control example 3.

DETAILED DESCRIPTION OF THE INVENTION

The subzero temperature fuel cell stack starting method, the subzero temperature fuel cell stack starting system, and the method of designing a fuel cell stack according to the present invention will now be described with reference to FIGS. 1 to 25.

Figure 1:
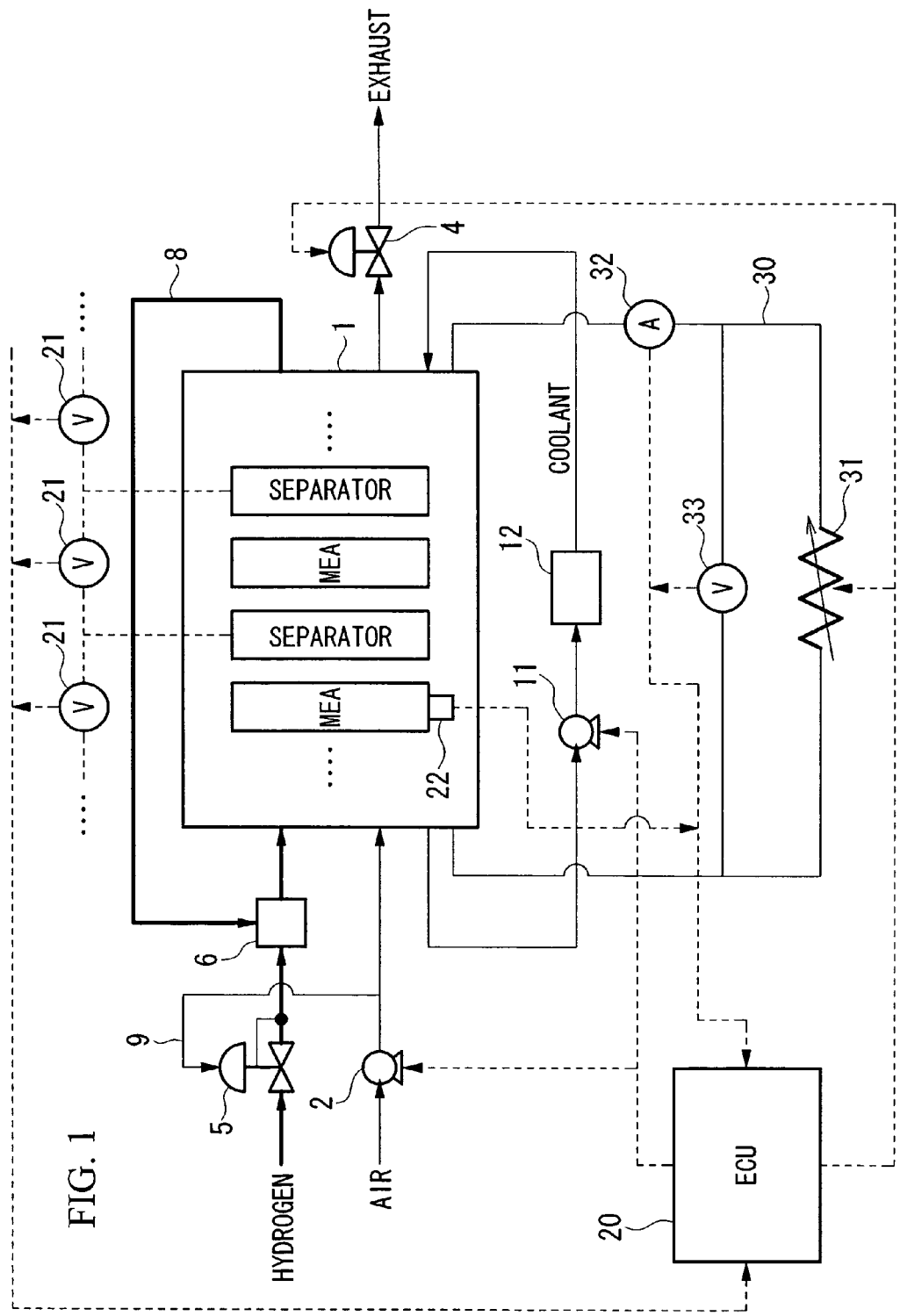
FIG. 1 is a schematic structural view of a system for starting up a fuel cell stack at a subzero temperature according to the present invention.
Figure 2:
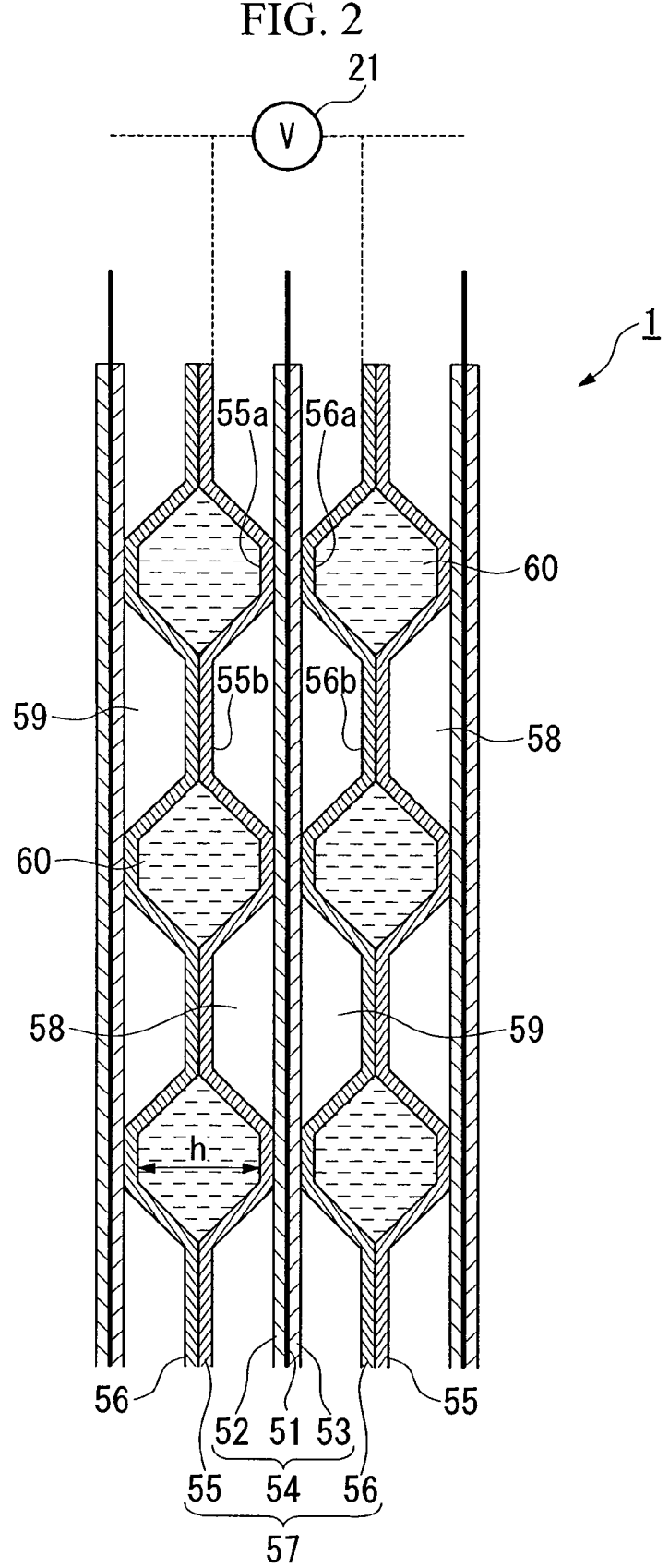
FIG. 2 is a cross-sectional view (i.e., a first example) showing a stacked state of single cells of a fuel cell stack that is used in this subzero temperature startup system.

FIG. 1 is a schematic structural view of a system for starting up a fuel cell stack at a subzero temperature, FIG. 2 is a cross-sectional view for describing the laminated structure of a fuel cell stack 1. Note that the fuel cell stack of the present embodiment is designed to be mounted in a fuel cell vehicle.

Firstly, a fuel cell stack 1 will be described with reference made to FIG. 2. The fuel cell stack 1 is a solid polymer type of fuel cell. The fuel cell stack 1 is formed by sandwiching the two sides of a solid polymer electrolyte membrane 51, which is formed, for example, by a solid polymer ion exchange membrane or the like, between an anode electrode 52 and cathode electrode 53 so as to form a membrane electrode assembly 54. Separators 55 and 56 are then placed on both sides of the membrane electrode assembly 54 so as to form a single cell (i.e., a fuel cell unit) 57. A plurality of the single cells 57 are then stacked so as to form the fuel cell stack 1. Note that, in FIG. 1, the membrane electrode assembly is abbreviated to "MEA", while the separators 55 and 56 are collectively referred to using the term "separator".

In the fuel cell stack 1, metal separators are employed for the separators 55 and 56. More specifically, the separators 55 and 56 are manufactured by press forming metal plates, and are provided with a cross-sectional waveform in which first flattened portions 55a and 56a and second flattened portions 55b and 56b are placed alternatingly. The separators 55 and 56 are stacked such that the first flattened portion 55a of the separator 55 is placed against the anode electrode 52 of the membrane electrode assembly 54, and such that the second flattened portion 56a of the separator 56 is placed against the cathode electrode 53 of the membrane electrode assembly 54. The second flattened portions 55b and 56b of the separators 55 and 56 that have been placed adjacent to each other are placed against each other.

Separators that are manufactured from metal can be made thinner than carbon separators, so that the size in the stacking direction of the fuel cell stack 1 can be shortened. In addition, they have the feature that they can be provided with a smaller heat capacity than carbon separators so that they can be warmed up more easily. A variety of metals that are suitable for press working can be used as the material for the metal separators. Preferably, a stainless steel based material that has undergone a surface processing in order to improve the corrosion resistance and contact resistance thereof is used.

In a fuel cell stack 1 that has been formed by stacking a plurality of single cells 57 in this manner, spaces that are formed between the separators 55 and the anode electrodes 52 form fuel flow passages (i.e., reaction gas flow passages) 58 through which hydrogen gas (i.e., anode gas, reaction gas) is circulated. Spaces that are formed between the separators 56 and the cathode electrodes 53 form air flow passages (i.e., reaction gas flow passages) 59 through which air (i.e., cathode gas, reaction gas) is circulated. Spaces that are formed between two separators 55 and 56 placed adjacent to each other form coolant flow passages 60 through which coolant is circulated.

Namely, the separators 55 and 56 have the function of separating anode gas from cathode gas, and also have the function of separating reaction gas flow passages from coolant flow passages.

Accordingly, the fuel cell stack 1 can be said to be a solid polymer electrolyte fuel cell stack that is formed by stacking a plurality of layers of membrane electrode assemblies 54, which are provided with a solid polymer electrolyte membrane 51 and electrodes 52 and 53, with separators 55 and 56.

In addition, the fuel cell stack 1 can be said to be a fuel cell stack that is formed by stacking a plurality of layers of membrane electrode assemblies 54, which are provided with a solid polymer electrolyte membrane 51 and electrodes 52 and 53, with metal separators 55 and 56 that have a cross-sectional waveform structure, and in which at least a portion of spaces that are enclosed by the separators and by separators that have been placed adjacent to these separators form coolant flow passages 60.

Furthermore, the fuel cell stack 1 can be said to be a fuel cell stack that is formed by stacking a plurality of layers of membrane electrode assemblies 54, which are provided with a solid polymer electrolyte membrane 51 and electrodes 52 and 53, with separators 55 and 56 that are placed between adjacent membrane electrode assemblies 54.

In this fuel cell stack 1, hydrogen ions that are generated by a catalytic reaction at the anode electrode 52 pass through the solid polymer electrolyte membrane 51 and travel to the cathode electrode 53, where they generate power by causing an electrochemical reaction with oxygen at the cathode electrode 53. Cooling is achieved as a result of heat being captured by the coolant that is circulating through the coolant flow passages 60 such that the fuel cell stack 1 does not exceed the operating temperature due to the heat that is generated by the power generation.

Moreover, in this fuel cell stack 1, a voltage sensor 21 that measures output voltages from each of the single cells 57 is connected to the separators 55 and 56 of each single cell 57. Output signals from the voltage sensors 21 are input into an electronic control unit (referred to below as an ECU) 20. Note that, in FIG. 2, only one voltage sensor 21 is shown due to limitations of the drawings.

Furthermore, in this fuel cell stack 1, a temperature sensor 22 that measures the temperature of the membrane electrode assembly 54 is provided in one single cell 57 that acts as a representative of the plurality of single cells 57 (see FIG. 1), and output signals from the temperature sensor 22 are input into the ECU 20.

Next, the fuel cell system will be described with reference made to FIG. 1.

Air is compressed by a compressor 2 and is supplied to the air flow passages 59 (see FIG. 2) of the fuel cell stack 1. After oxygen in this air has served as an oxidizing agent for power generation, it is discharged as cathode off gas from the fuel cell stack 1, and is released to the atmosphere via a pressure control valve 4. The number of revolutions of the compressor 2 is controlled by the ECU 20 such that a mass of air that corresponds to the output required from the fuel cell stack 1 is supplied to the fuel cell stack 1. The aperture of the pressure control valve 4 is controlled by the ECU 20 such that the air supply pressure at which air is supplied to the fuel cell stack 1 is at a pressure value that corresponds to the operating state of the fuel cell stack 1.

Note that the air that is supplied to the fuel cell stack 1 is controlled such that the quantity of air that is supplied to the fuel cell stack 1 and also the air supply pressure are greater when the amount of power that the fuel cell stack 1 needs to generate is greater.

In contrast, after hydrogen gas that has been released from a high-pressure hydrogen tank (not shown) has been decompressed by a fuel supply control valve 5, it passes through an ejector 6 and is supplied to the fuel flow passages 58 (see FIG. 2) of the fuel cell stack 1. Hydrogen gas that has not served to generate power in the fuel cell stack 1, namely, unreacted hydrogen gas is discharged as anode off gas from the fuel cell stack 1, and passes through an anode off gas recovery flow passage 8 to be suctioned by the ejector 6. It is then mixed with the hydrogen gas that is supplied from the high-pressure hydrogen tank and is once again supplied to the fuel cell stack 1.

The fuel supply control valve 5 may be formed, for example, by a pneumatic proportional pressure control valve. The pressure of air that is supplied from the compressor 2 is input via an air signal introduction passage 9 into the fuel supply control valve 5 as a signal pressure (i.e., a reference pressure), and the pressure of hydrogen gas at the outlet of the fuel supply control valve 5 is controlled so as to be within a predetermined pressure range that corresponds to this signal pressure. Note that, as is described above, because the air that is supplied to the fuel cell stack 1 is controlled such that the air supply pressure is greater when the power demands on the fuel cell stack 1 are greater, hydrogen gas whose air supply pressure is controlled as a reference pressure is also controlled such that the hydrogen gas supply pressure is greater and the quantity of hydrogen gas that is supplied is greater when the power demands on the fuel cell stack 1 are greater.

The pressure of the coolant that is used for cooling the fuel cell stack 1 is raised by a water pump 11 and the coolant is then supplied to a radiator 12. The coolant is cooled in the radiator 12 by the heat thereof being discharged to the outside, and the coolant is then supplied to be fuel cell stack 1 so as to cool the fuel cell stack 1 by capturing heat from the fuel cell stack 1 as it passes through the coolant flow passages 60 (see FIG. 2) inside the fuel cell stack 1. Coolant that has become heated as a result of this is then returned once more to the radiator 12 via the water pump 11 and is cooled. The ECU 20 controls the operation of the water pump 11 such that the amount of coolant that is circulated corresponds to the operating state of the fuel cell stack 1, and stops the water pump 11 when the coolant drops below a predetermined temperature.

An electrical circuit 30 that is provided with an external load 31 is connected to the fuel cell stack 1. The external load 31 is variable. The electrical circuit 30 is provided with a current sensor 32 that is used to measure an output current (namely, the obtained current) from the fuel cell stack 1, and a voltage sensor 33 that is used to measure the terminal voltage (referred to below as stack voltage) of the fuel cell stack 1. Output signals from the current sensor 32 and voltage sensor 33 are input into the ECU 20.

Note that, although omitted from the drawings, power that is obtained from the power generation of the fuel cell stack 1 can also be used to charge an auxiliary battery, and a structure is employed in which the various auxiliary devices that are required to operate the fuel cell stack 1, such as the compressor 2 and the water pump 11, are able to be supplied with power by the fuel cell stack 1 or by the auxiliary battery.

In a subzero temperature start-up system for this fuel cell stack 1, in order for it to be possible to reliably and quickly start up the fuel cell stack 1 even when the start-up is conducted at a subzero temperature, the heat capacity in the power generating section of the fuel cell stack 1 is set to a predetermined capacity and, in addition, the power generating state of the fuel cell stack 1 is controlled so as to be a predetermined state. This will now be described in detail.

Firstly, the heat capacity in the power generating section of the fuel cell stack 1 will be described.

Figure 3:
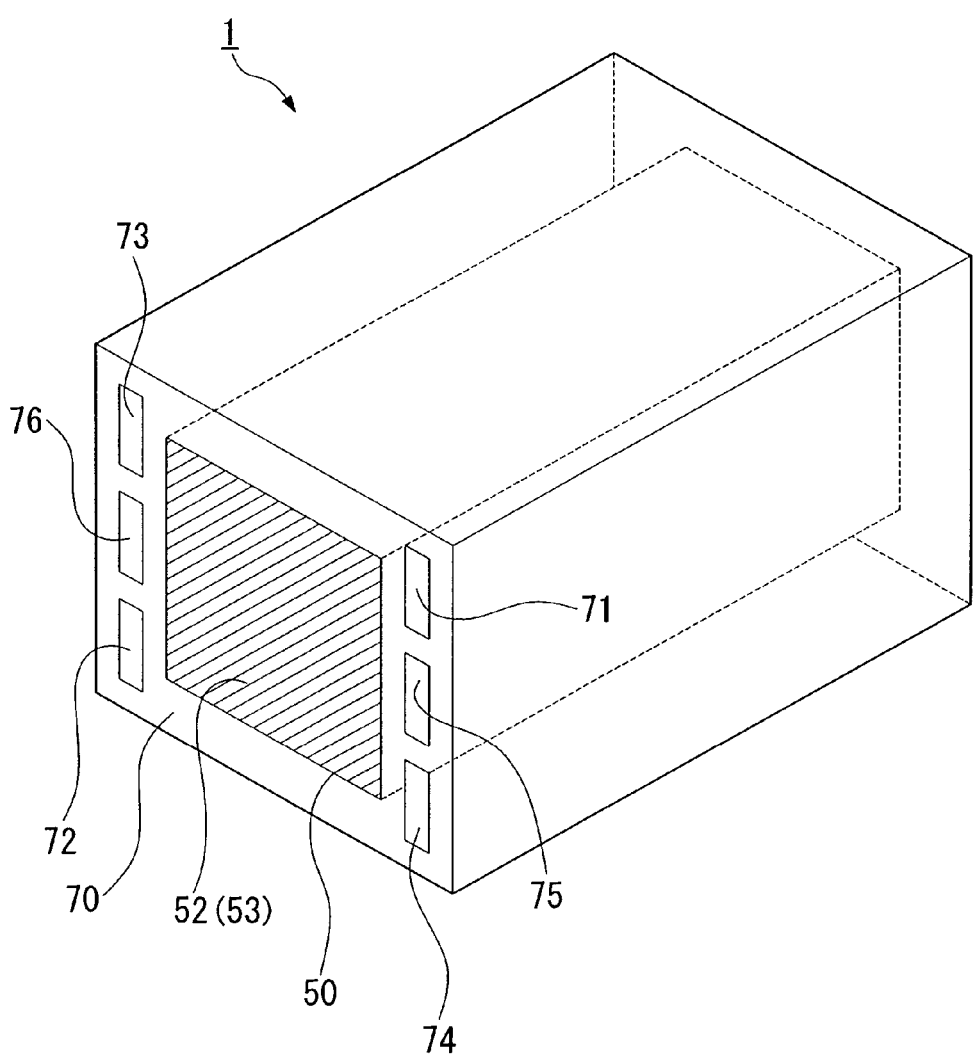
FIG. 3 is a schematic perspective view of a fuel cell stack.

Firstly, a definition of the power generating section of the fuel cell stack 1 will be given. The term "power generating section 50 of the fuel cell stack 1" refers essentially to a range in which power is generated, specifically, a three-dimensional volume in which the electrodes 52 and 53 can be superposed in a stacking direction. As is shown in FIG. 3, the fuel cell stack 1 is provided with a header section 70 surrounding the power generating section 50, which is the three-dimensional volume in which the electrodes 52 and 53 can be superposed in the stacking direction. In this header section 70, a fuel distribution flow passage 71, an anode off gas collection flow passage 72, an air distribution flow passage 73, a cathode off gas collection flow passage 74, a coolant distribution flow passage 75, and a coolant collection flow passage 76 are each provided so as to penetrate each single cell 57 in the stacking direction, and the stacked state of the single cells 57 is maintained by stud bolts (not shown) that are mounted so as to penetrate the header section 70.

Namely, in the present application, when referring to the power generating section of the fuel cell stack 1, those sections other than the header section 70 are included.

Note that the fuel distribution flow passage 71 and the anode off gas collection flow passage 72 are connected to the fuel flow passages 58 of each single cell 57, the air distribution flow passage 73 and the cathode off gas collection flow passage 74 are connected to the air flow passages 59 of each single cell 57, and the coolant distribution flow passage 75 and the coolant collection flow passage 76 are connected to the coolant flow passages 60 of each single cell 57.

Figure 4:
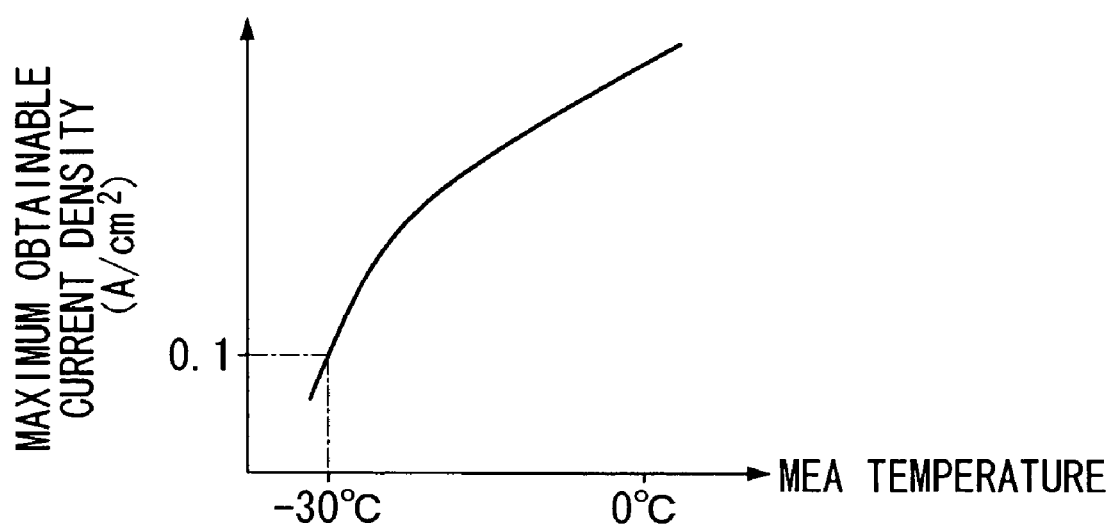
FIG. 4 is a characteristic view showing the maximum obtainable current density in a solid polymer type of fuel cell.

In a solid polymer electrolyte fuel cell stack 1, the current density that can be generated stably (referred to below as the maximum obtainable current density) is determined in accordance with the cell internal temperature from the temperature characteristics of the electrolytic material that governs ion conduction, which is the material of the solid polymer electrolyte membrane 51. FIG. 4 shows an example of the maximum obtainable current density characteristics. In the case of this example, under conditions, for example, in which the cell internal temperature is approximately −30° C., the maximum obtainable current density is approximately 0.1 A/cm$^2$.

Moreover, although omitted from the drawing in FIG. 2, the membrane electrode assembly 54 is provided with a porous diffusion layer used for diffusing reaction gas on outer sides of the electrodes 52 and 53. The fact that the size of the holes (referred to below as the holes in the membrane electrode assembly 54) in this diffusion layer has an effect on the cell voltage in normal operating conditions and on the length of time from the subzero start-up commencement temperature to the time when a voltage drop occurs when power generation commences (referred to below as the limited time for start-up) was determined by experiments conducted by the inventors of the present invention.

TABLE 1 is an example showing a relationship between the cell voltage and the size of the holes in the membrane electrode assembly when a cell internal temperature of 70° C. and a maximum obtainable current density of approximately 0.5 A/cm$^2$ were set as normal operating conditions. In the case of TABLE 1, single cells in which the size of the holes in the membrane electrode assembly 54 range from small to large are able to provide a sufficient cell voltage in practical use, however, single cells in which the size of the holes was extremely small were not practical as the cell voltage was too small.

TABLE 1

Cell voltage under normal operating conditions (70° C., 0.5 A/cm$^2$)

| Size of holes in membrane electrode assembly | Cell voltage (V) |
| --- | --- |
| Small | 0.71 |
| Medium | 0.71 |
| Large | 0.70 |
| Extremely small | 0.2 |

TABLE 2 is an example showing a relationship in single cells that are provided with membrane electrode assemblies 54 having the same sized holes as those in TABLE 1 between the limited time for start-up and the size of the holes in the membrane electrode assembly 54, when the start-up commencement temperature was −30° C. and a constant current was generated at the maximum obtainable current density at this start-up commencement temperature (0.1 A/cm2). Note that, because the cell voltage of the membrane electrode assembly 54 whose hole size was extremely small was too small under normal operating conditions to be of any practical use, it is omitted from TABLE 2.

TABLE 2

Single cell limited time for start-up
(Start-up commencement temperature: −30° C.,
Current density: 0.1 A/cm$^2$)

| Size of holes in membrane electrode assembly | Limited time for start-up (sec) |
|---|---|
| Small | 180 |
| Medium | 340 |
| Large | 720 |

From TABLE 2, it can be seen that the smaller the size of the holes in the membrane electrode assembly 54, the shorter the limited time for start-up, and the larger the size of the holes, the longer the limited time for start-up. It is assumed that the reason for this is that if reaction generated water that has adhered to the holes freezes and the holes become blocked, the reaction gas is unable to reach the solid polymer electrolyte membrane 51, thereby preventing the generation of power. However, when the holes are smaller, the blockage caused by freezing occurs more rapidly, while, conversely, when the holes are larger, it is more difficult for blockages caused by freezing to occur.

In this manner, a limited time for start-up that corresponds to the start-up commencement temperature is determined by the size of the holes in the membrane electrode assembly 54. In other words, the membrane electrode assembly 54 has a unique limited time for start-up that corresponds to the start-up commencement temperature.

Next, the effects of the heat capacity of the power generating section 50 of the single cells 57 on the temperature increase of the membrane electrode assembly 54 will be considered.

Figure 5:
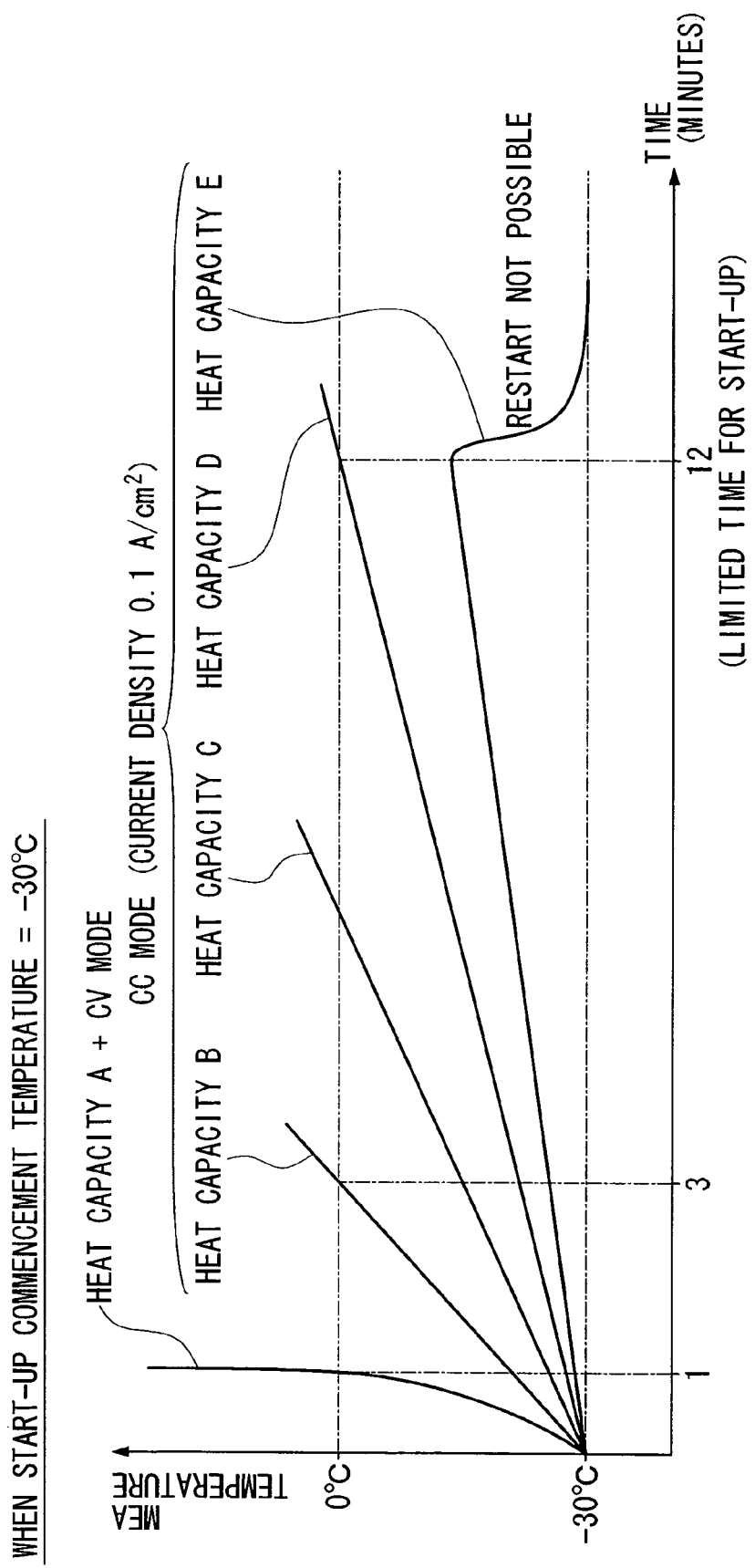
FIG. 5 is a temperature characteristic view of a membrane electrode assembly.

FIG. 5 shows the results in graph form when temperature characteristics of the membrane electrode assemblies 54 are determined by experiment when power is generated with the start-up commencement temperature at −30° C., for a single cell 57 that is provided with membrane electrode assemblies 54 whose hole size is "Large" in TABLE 2 and whose heat capacity differs per unit area in the power generating section 50. Note that the term "CC mode" in the drawing is an abbreviation of constant current generation mode, while the term "CV mode" is an abbreviation of constant voltage mode. The compared heat capacities per unit area of the single cells 57 were: heat capacity A=0.092 J/K·cm$^2$; heat capacity B=0.33 J/K·cm$^2$; heat capacity C=0.55 J/K·cm$^2$; heat capacity D=1.32 J/K·cm$^2$; and heat capacity E=1.94 J/K·cm$^2$ (i.e., A<B<C<D<E). For the single cells 57 of the heat capacities B to E, these are the results when constant current was generated at a maximum obtainable current density (i.e., 0.1 A/cm$^2$) at the start-up commencement temperature (i.e., −30° C.), while for the single cell 57 of the heat capacity A, this is the result when constant voltage was generated from the start-up commencement temperature (i.e., −30° C.).

The following points can be made from these temperature characteristics.

(1) The rate of temperature increase of the membrane electrode assembly 54 is related to the heat capacity of the power generating section 50 of the single cells 57. Namely, the smaller the heat capacity per unit area of the power generating section 50, the faster the rate of temperature increase. Conversely, the greater the heat capacity per unit area of the power generating section 50, the slower the rate of temperature increase. This is clear from a comparison between the single cells 57 of the heat capacities B to E, which have the same power generating conditions. Among these, the rate of temperature increase of heat capacity B, which has the smallest heat capacity per unit area, is the fastest, while the rate of temperature increase of heat capacity E, which is the largest, is the slowest.

(2) An upper limit value (referred to below as the maximum heat capacity) that is used for raising the temperature of the membrane electrode assembly 54 to 0° C. or more within the limited time for start-up, and then maintaining the power generation subsequently, is present in the heat capacities per unit area of the power generating section 50. This is clear from a comparison between the single cells 57 of the heat capacities D and E, which have the same power generating conditions. In the example shown in FIG. 5, in the single cell 57 of the heat capacity D, the temperature of the membrane electrode assembly 54 reaches 0° C. at the same time as the limited time for start-up expires, while in the single cell 57 of the heat capacity E, which is larger than the heat capacity D, not only does the temperature of the membrane electrode assembly 54 not reach 0° C. by the time the limited time for start-up has expired, but the temperature thereafter actually decreases. In this case, the heat capacity D becomes the maximum heat capacity.

Accordingly, in order to make it possible to maintain power generation using only the self-generated heat that accompanies power generation, it is necessary to set the heat capacity per unit area in the power generating section of the unit cells 57 to the maximum heat capacity or less.

Note that the maximum heat capacity is specified by the start-up commencement temperature and the membrane electrode assembly that is used.

TABLE 3 shows dimensional data of each section in each single cell 57 of the heat capacities A to E, and compares the thicknesses of the metal separators 55 and 56 (namely, the plate thicknesses), the thicknesses of the membrane electrode assemblies 54, and the depths of the coolant passages 60 (i.e., the "h" in FIG. 2). The "none" that is recorded in the column for the depth of the coolant passage 60 in TABLE 3 shows that the coolant has been removed from the coolant passage 60 and has been replaced with air. From the results shown in TABLE 3, it can be seen that the heat capacity of the power generating section 50 in the single cells 57 is affected to a considerable extent by the height of the coolant passage 60, namely, the quantity of coolant that is held in the single cells 57 has a considerable effect on the heat capacity of the power generating section 50. Therefore, in order to set a small heat capacity per unit area in the power generating sections 50 of the single cells 57, a vital point when designing the single cells 57 is how small the capacity of the coolant passages 60 is to be made.

TABLE 3

| Heat capacity (J/k·cm²) | Heat capacity A (0.092) | Heat capacity B (0.33) | Heat capacity C (0.55) | Heat capacity D (1.32) | Heat capacity E (1.94) |
|---|---|---|---|---|---|
| Separator thickness (mm) | 0.1 | 0.15 | 0.45 | 1.3 | 2.0 |
| Membrane electrode assembly thickness (mm) | 0.09 | 0.13 | 0.13 | 1.4 | 1.4 |
| Coolant passage depth (mm) | None | 0.5 | 0.5 | 0.8 | 1.0 |

Here, a summary of a method of designing a fuel cell stack 1 that is suitable for the subzero temperature start-up system of the present embodiment will now be given.

Figure 25:
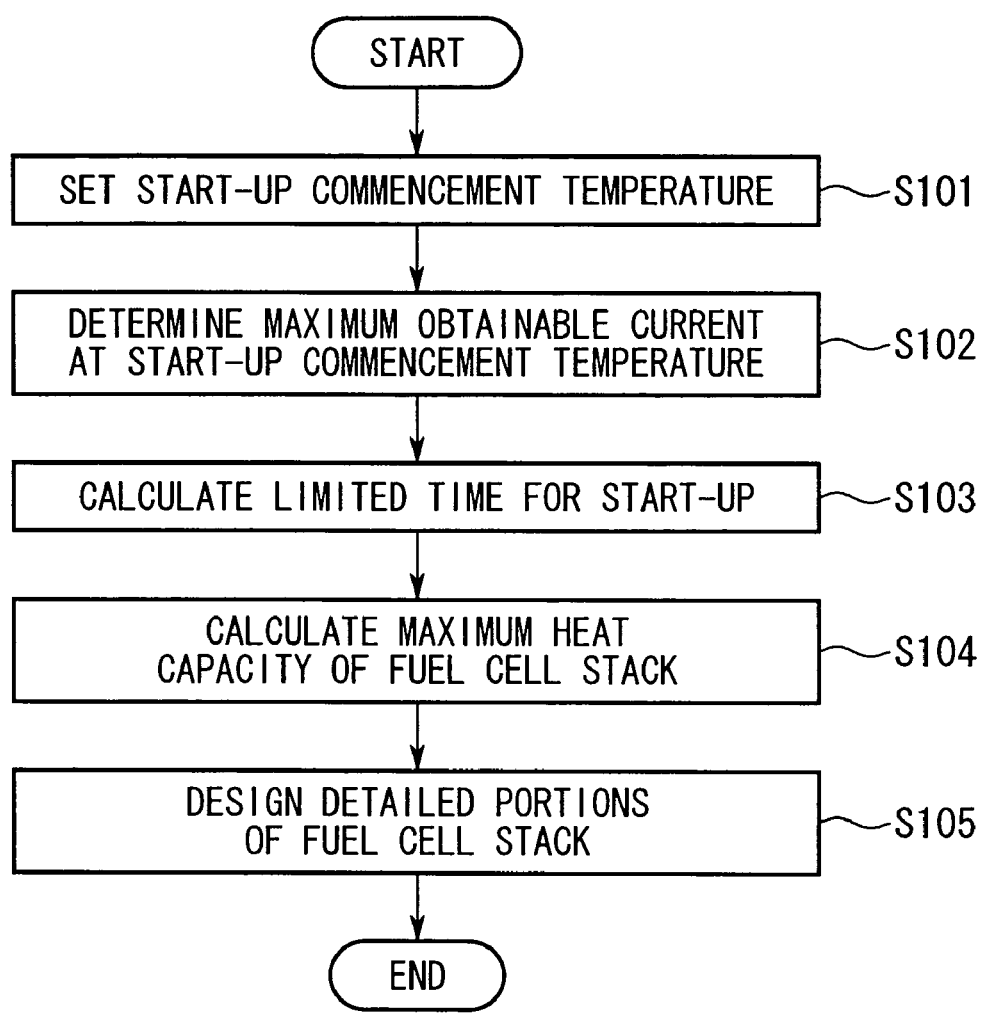
FIG. 25 is a design process view showing a method of designing the fuel cell stack according to the present invention.

The description will be given in accordance with the design process view for a fuel cell stack 1 shown in FIG. 25. Firstly, in step S101, a predetermined subzero temperature (for example, −30° C.) is set as the start-up commencement temperature. The start-up commencement temperature becomes a design standard temperature and can be set as is appropriate.

Next, in step S102, a maximum obtainable current density at the start-up commencement temperature is determined based on the maximum obtainable current density characteristics (see FIG. 4) of the membrane electrode assembly 54 that is used, and the maximum obtainable current at this start-up commencement temperature is determined from the size of the power generating section 50 of the fuel cell stack 1.

Next, in step S103, the limited time for start-up of the membrane electrode assembly 54 that is being used is calculated. Namely, for the single cell that is provided with the membrane electrode assembly 54 being used, the limited time for start-up at the time when a constant current is generated at the maximum obtainable current density at the start-up commencement temperature is calculated from the start-up commencement temperature set in step S101 by referring to experimental data that has been collected in advance.

Next, in step S104, based on the start-up commencement temperature set in step S101 and on the limited time for start-up calculated in step S103, the maximum heat capacity per unit area per single cell in the power generating section 50 of the fuel cell stack 1 is calculated. From this, the maximum heat capacity in the power generating section 50 of the fuel cell stack 1 is calculated.

Here, the term "per single cell" means dividing the heat capacity of a three-dimensional portion obtained by stacking electrode portions in the stacking direction (namely, of the power generating section 50) by the number of layers of the membrane electrode composite body 54. The heat capacity per single cell that is thereby obtained is then further divided by the surface area of the electrode portion (i.e., the power generating section 50) so as to give the "heat capacity per unit area per single cell".

Here, when calculating the maximum heat capacity per unit area per single cell, after considering the amount of heat generated in the power generating section 50 and the amount of discharge heat that is discharged from the power generating section 50 to the header section 70, an amount of heat that is obtained by subtracting the amount of discharge heat from the amount of generated heat is calculated as the amount of heat that is essentially used for the increase in temperature of the power generating section 50. The amount of heat generated in the power generating section 50 can be calculated as the amount of heat that is generated from the start-up commencement temperature until the temperature reaches 0° C. when constant current is generated at the maximum obtainable current density that corresponds to this start-up commencement temperature, and the amount of discharge heat can be calculated by experiment (or by experience). Note that when a coolant is circulating during start-up, the amount of heat that is captured by coolant in the coolant flow passages is included in the amount of discharge heat.

Next, in step S105, detailed portions of the single cells 57 that use the metal separators 55 and 56 are designed such that the maximum heat capacity per unit area per single cell is less than what was calculated in step S104. As was described above, because the quantity of coolant that is held in the single cells 57 has a considerable effect on the heat capacity of the power generating section 50, if it is assumed that the fuel cell stack 1 is started while coolant is being held in the coolant flow passages 60, it is extremely effective for reducing the heat capacity per unit area per single cell if the single cells 57 are designed such that the quantity of coolant that is held therein is reduced.

If the fuel cell stack 1 is designed in this manner, the heat capacity of the fuel cell stack 1 can be set to a heat capacity such that, in a case in which the temperature of the fuel cell stack 1 is raised by self-generated heat when power is generated while the maximum obtainable current at a predetermined start-up commencement temperature is maintained, the temperature of the membrane electrode assembly 54 reaches 0° C. or more before the membrane electrode assembly 54 becomes unable to generate power.

Note that if the design conditions include completing warm-up inside three minutes even when the start-up commencement temperature is −30° C., then it is desirable that the heat capacity per unit area per single cell is between 0.04 and 0.33 J/K·cm².

A variety of methods of designing the fuel cell stack 1 in order to reduce the quantity of coolant that is held therein may be considered, and the methods described below can be given as examples.

(1) As in the example shown in FIG. 2, by forming the separators 55 and 56 with a cross-sectional configuration in which the shorter first flattened portions 55a and 56a alternate with the longer second flattened portions 55b and 56b, and by placing the first flattened portions 55a of the separators 55 in contact with the anode electrodes 52 of the membrane electrode assemblies 54, and placing the first flattened portions 56a of the separators 56 in contact with the cathode electrodes 53 of the membrane electrode assemblies 54, and by placing in contact with each other the second flattened portions 55b and 56b of separators 55 and 56 that are placed adjacent to each other, the surface area of the coolant flow passages 60 is reduced compared to the fuel flow passages 58 and the air flow passages 59, resulting in the quantity of coolant that is held being reduced.

Figure 6:
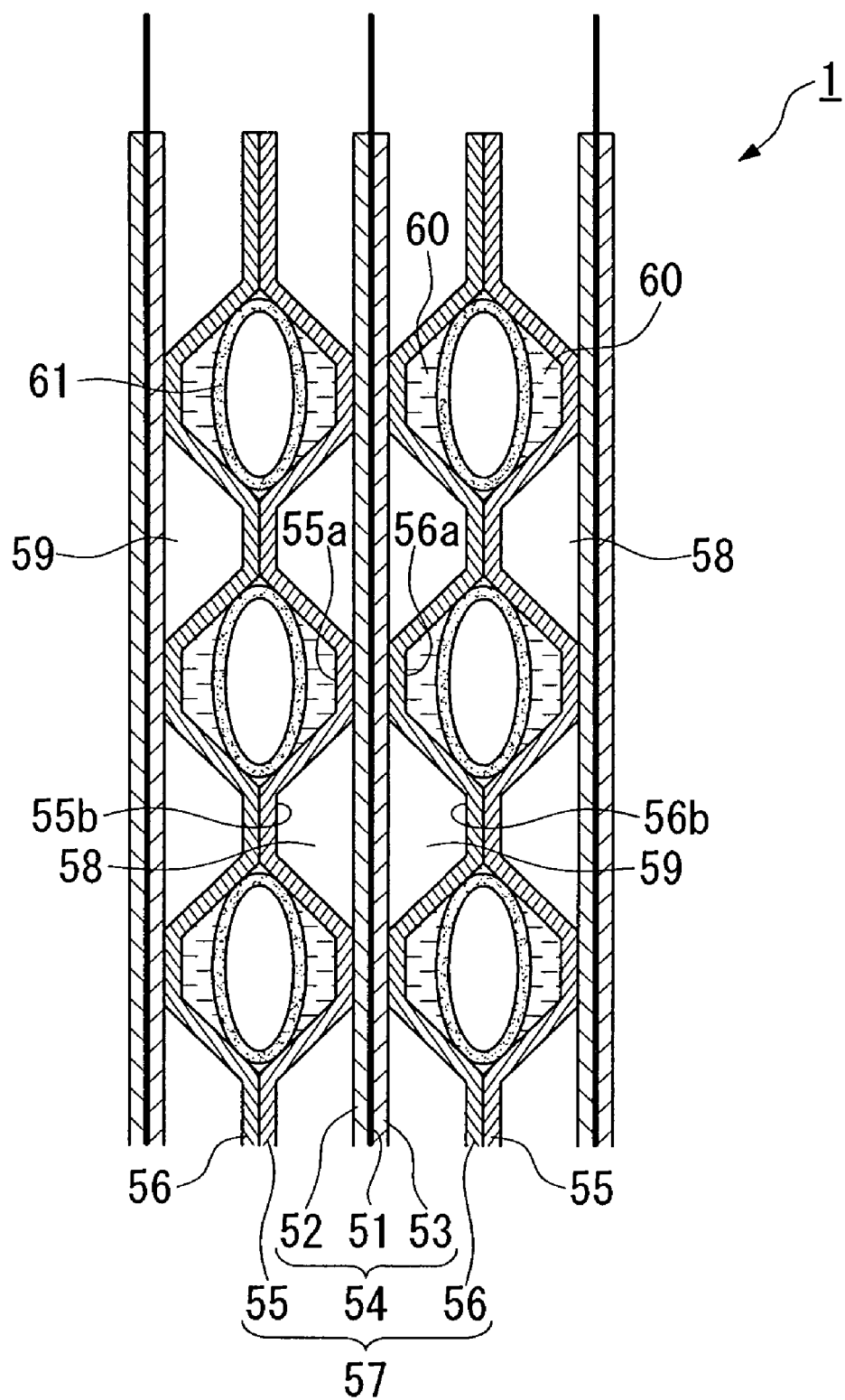
FIG. 6 is a cross-sectional view (i.e., a second example) showing a stacked state of single cells of a fuel cell stack that is used in this subzero temperature startup system.

(2) As in the example shown in FIG. 6, by providing inners 61 in spaces formed between separators 55 and 56 that are placed adjacent to each other without performing any other special work on the separators 55 and 56, and by using the spaces formed between the separators 55 and 56 and the inners 61 as coolant flow passages 60, the surface area of the coolant flow passages 60 is reduced, resulting in the quantity of coolant that is held being reduced. Note that, even if there is a small quantity of coolant being held, because coolant that passes through the coolant flow passages 60 comes into direct contact with the separators 55 and 56, the capability of the coolant to cool the membrane electrode assemblies 54 can be satisfactorily maintained. Note also that the inners 61 may be shaped like hollow pipes, such as is shown in FIG. 6, or may be shaped as solid pipes. Whichever type is used, the inners 61 are formed from a material that is lightweight, has a low heat capacity, and does not allow the coolant to seep into it. Because metal has considerable weight and, as a result, has a large heat capacity, it is not preferable as the material for the inners 61. In addition, the inners 61 are immovably mounted relative to the separators 55 and 56.

Figure 7:
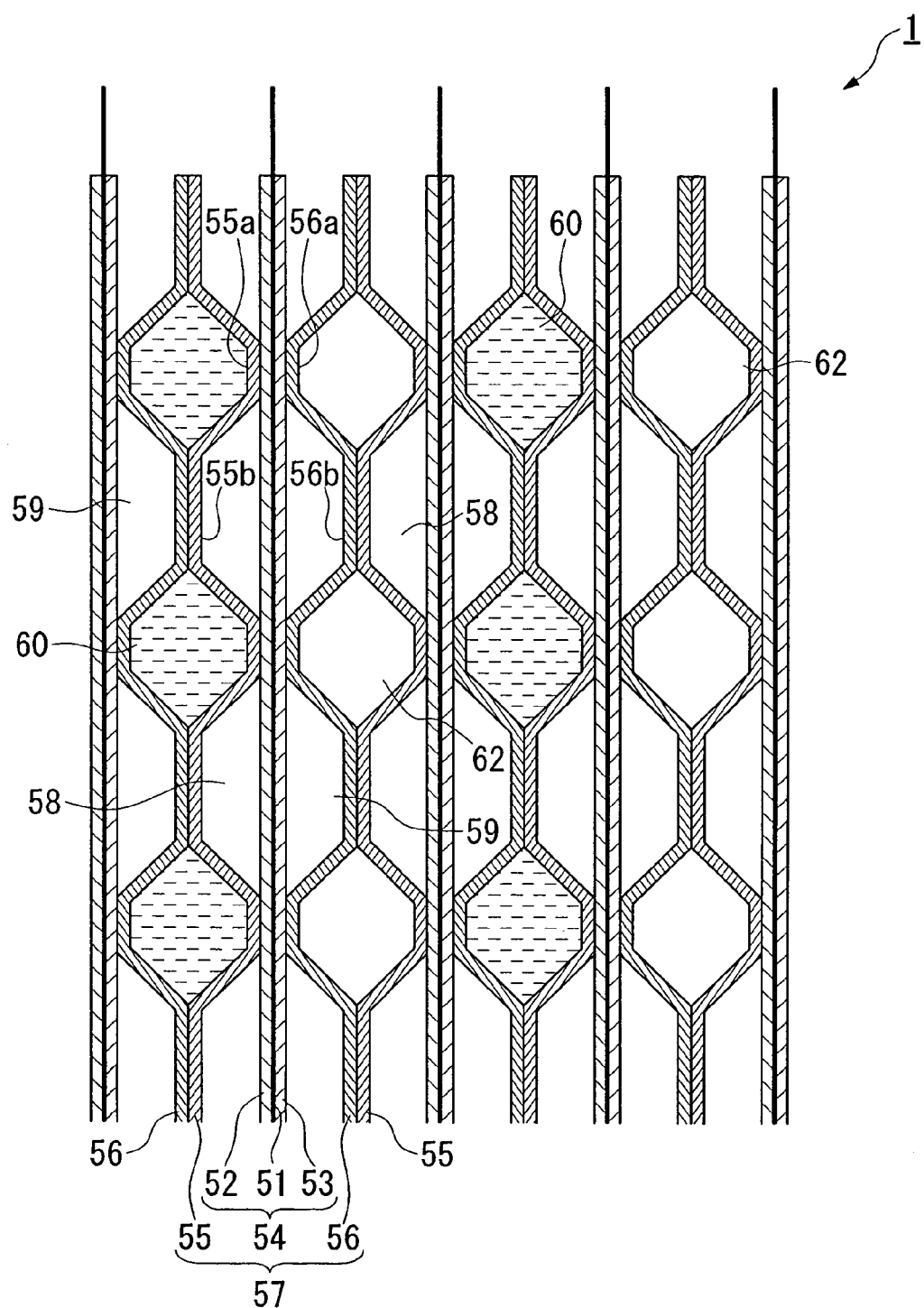
FIG. 7 is a cross-sectional view (i.e., a third example) showing a stacked state of single cells of a fuel cell stack that is used in this subzero temperature startup system.

(3) As in the example shown in FIG. 7, by not using all the spaces that are formed between separators 55 and 56 that are placed adjacent to each other as coolant flow passages 60, but instead, for example, using every second space as a coolant flow passage 60 and using the spaces between the separators 55 and 56 that are not used as coolant flow passages 60 as air layers 62, the surface area of the coolant flow passages 60 in the fuel cell stack 1 as a whole is reduced, and the overall quantity of coolant that is held in the fuel cell stack 1 is reduced.

Namely, in this fuel cell stack 1, the spaces that are formed between the membrane electrode assemblies 54 and the separators 55 and 56 are used as reaction gas flow passages (i.e., as the fuel flow passages 58 and the air flow passages 59), a portion of the plurality of spaces that are formed between separators 55 and 56 that are placed adjacent to each other are used as coolant flow passages 60, and the remainder form the air layers 62.

Note that even when the coolant flow passages 60 are thinned out and the air layers 62 are provided, because it is possible to partition the coolant flow passages 60 and the air layers 62 using the separators 55 and 56, which have the same cross-sectional configuration, it is possible to achieve a reduction in cost as components can be used in common.

Figure 8:
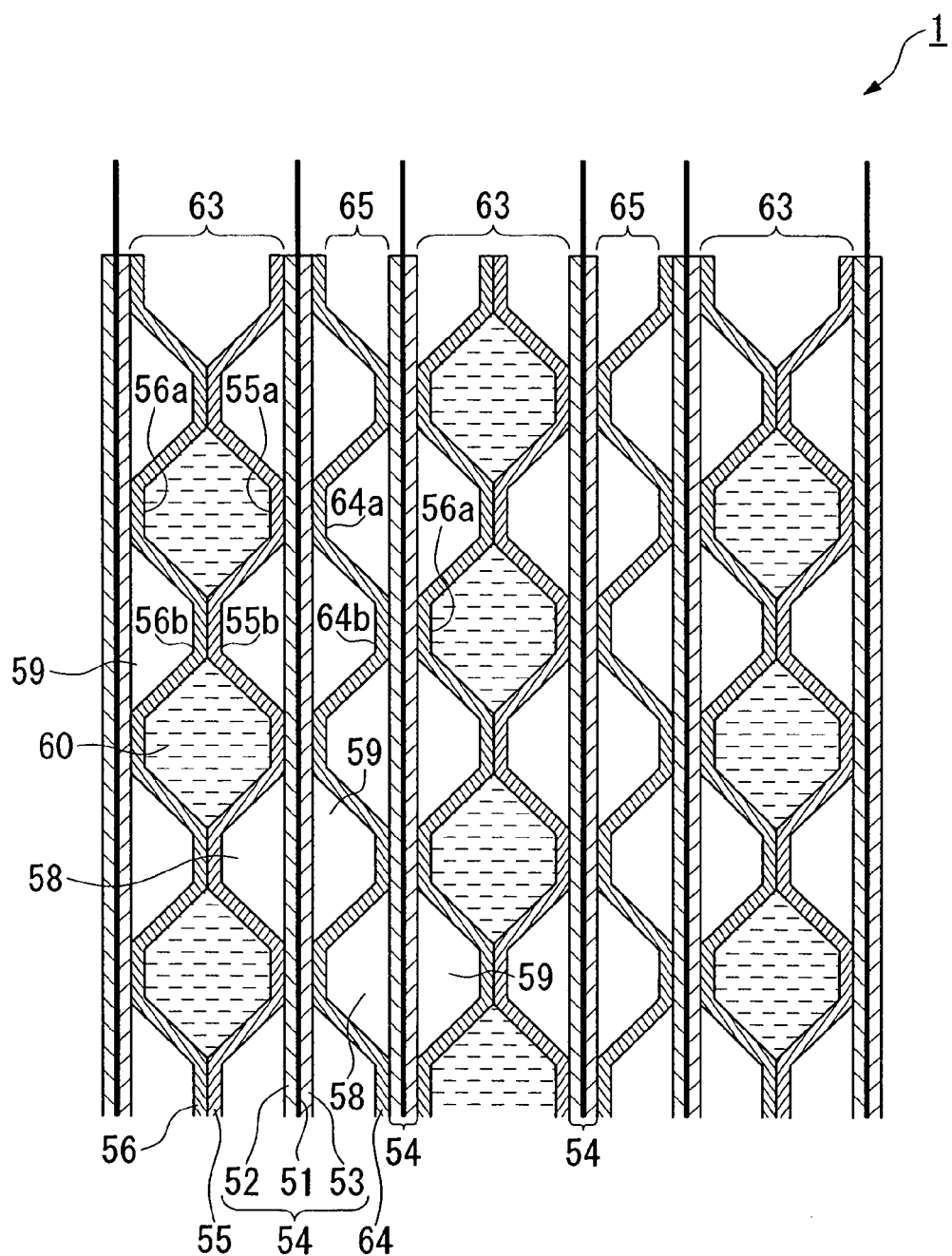
FIG. 8 is a cross-sectional view (i.e., a fourth example) showing a stacked state of single cells of a fuel cell stack that is used in this subzero temperature startup system.

(4) As in the example shown in FIG. 8, first fluid flow passage sections 63 that are formed by stacking a pair of separators 55 and 56 between membrane electrode assemblies 54 and 54 that are adjacent to each other can be formed alternatingly with second fluid flow passage sections 65 that are formed by placing a single separator 64 between membrane electrode assemblies 54 and 54 that are adjacent to each other. In the first fluid flow passage sections 63, spaces that are formed between the membrane electrode assemblies 54 and the separators 55 form fuel flow passages 58, spaces that are formed between the membrane electrode assemblies 54 and the separators 56 form air flow passages 59, and spaces that are formed between the two separators 55 and 56 form coolant flow passages 60. In the second fluid flow passage sections 65, spaces that are formed between the cathode electrodes 53 of the membrane electrode assemblies 54 and the separators 64 form air flow passages 59, and spaces that are formed between the anode electrodes 52 of the membrane electrode assemblies 54 and the separators 64 form fuel flow passages 58.

Namely, by providing the first fluid flow passage sections 63 that have the coolant flow passages 60 alternatingly with the second fluid flow passage sections 65 that do not have the coolant flow passages 60, the overall quantity of coolant that is held in the fuel cell stack 1 is reduced.

Note that, in this case, the first flattened sections 55a, 56a, and 64a and the second flattened sections 55b, 56b, and 64b of the separators 55, 56, and 64 have the same dimensions. Moreover, it is preferable if the first flattened portions 55a of the separators 55 and the first flattened portions 64a of the separators 64 are positioned so as to face each other from either side of the membrane electrode assemblies 54, and the first flattened sections 56a of the separators 56 and the second flattened sections 64b of the separators 64 are positioned so as to face each other from either side of the membrane electrode assemblies 54, as this makes it difficult for a shearing force to be generated in the membrane electrode assemblies 54.

Figure 9:
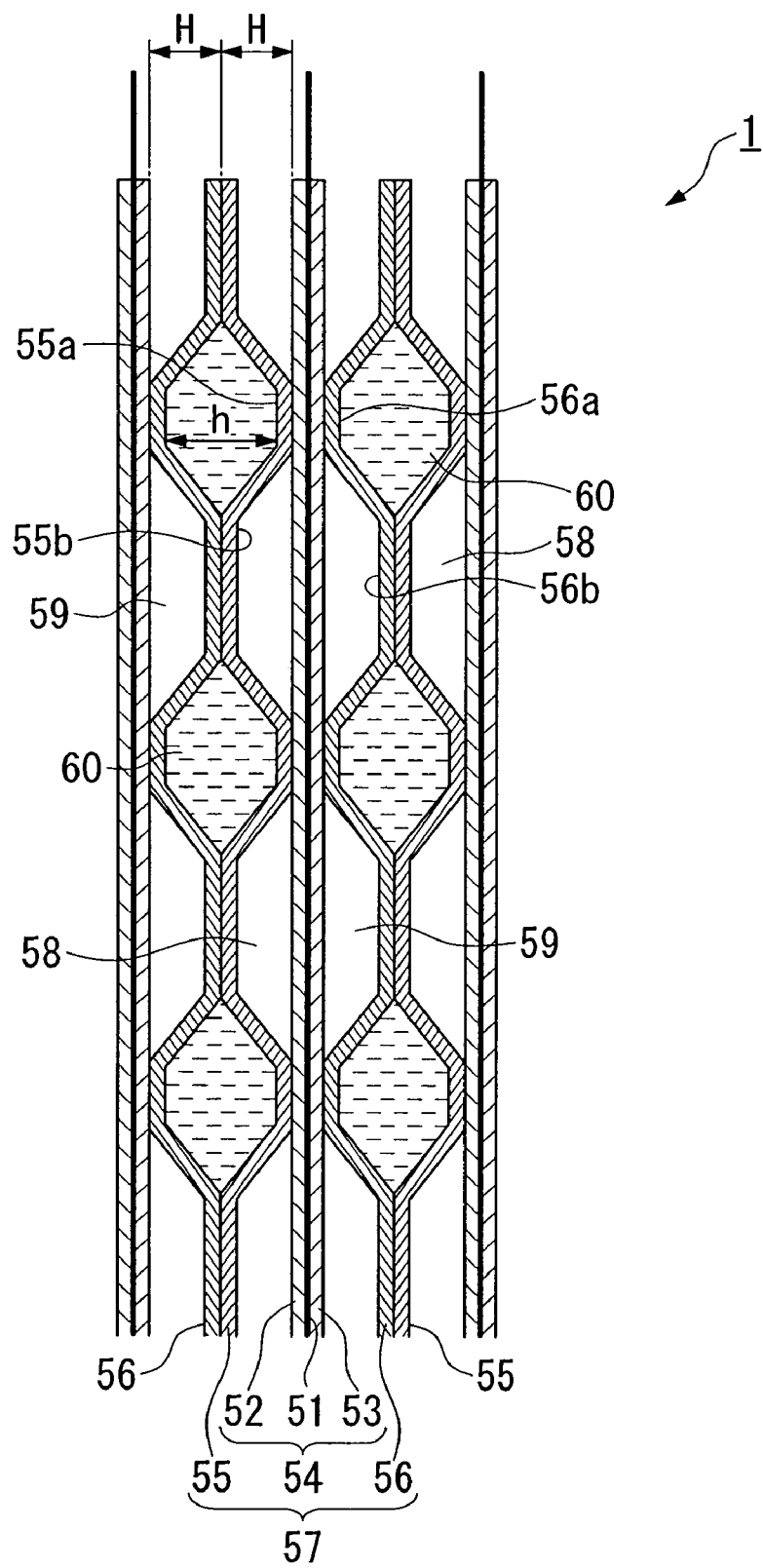
FIG. 9 is a cross-sectional view (i.e., a fifth example) showing a stacked state of single cells of a fuel cell stack that is used in this subzero temperature startup system.

(5) As in the example shown in FIG. 9, the depth of the coolant flow passages 60 can be decreased by lowering the height H of the separators 55 and 56. This results in the surface area of the coolant flow passages 60 being reduced, and in the quantity of coolant that is held being decreased.

Note that it is also possible to reduce the surface area of the coolant flow passages 60 and thereby decrease the quantity of coolant that is being held using a method other than those described in the above (1) to (5).

Next, a relationship between the start-up commencement temperature, the obtained current density, and the limited time for start-up when the heat capacity of the single sells 57 is set to the maximum heat capacity or less will be considered.

Figure 10:
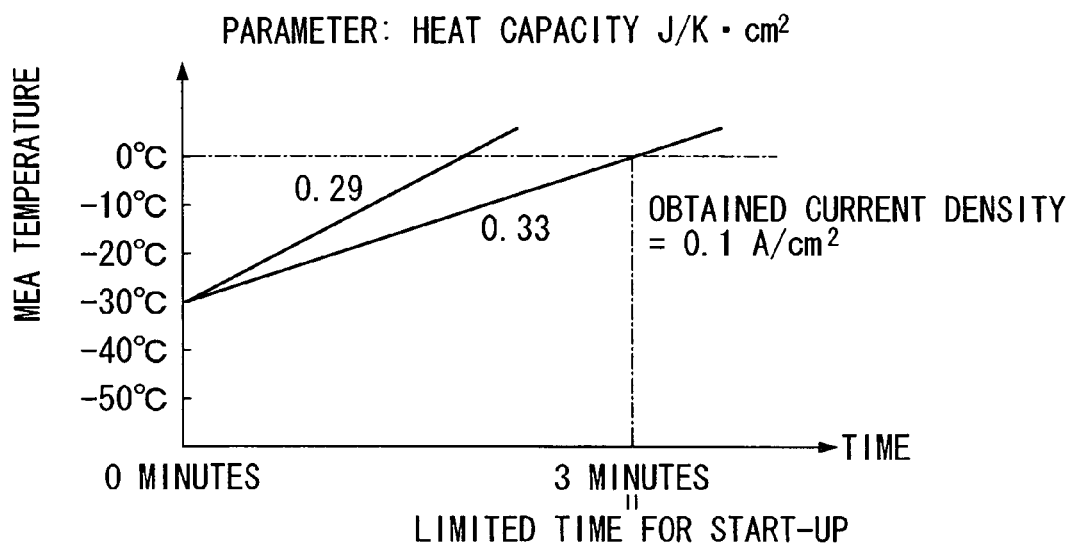
FIG. 10 is a temperature characteristic view of a membrane electrode assembly.

FIG. 10 shows temperature increase characteristics of a single cell 57 in which the limited time for start-up is, for example, three minutes when constant current power generation is conducted at the maximum obtainable current density using a membrane electrode assembly 54 in which the start-up commencement temperature is set to −30° C. and the maximum obtainable current density is 0.1 A/cm$^2$. If it is accepted that the maximum heat capacity per unit area in the power generating section 50 of the single cells 57 is 0.33 J/K·cm$^2$, then in the case of a single cell 57 having a smaller heat capacity (i.e., 0.29 J/K·cm$^2$) than the maximum heat capacity, the rate of temperature increase is faster than that of the maximum heat capacity.

With the temperature increase characteristics at this time taken as standard, the temperature increase characteristics were checked when the obtained current density and the start-up commencement temperature were changed using single cells 57 having these heat capacities.

Figure 11:
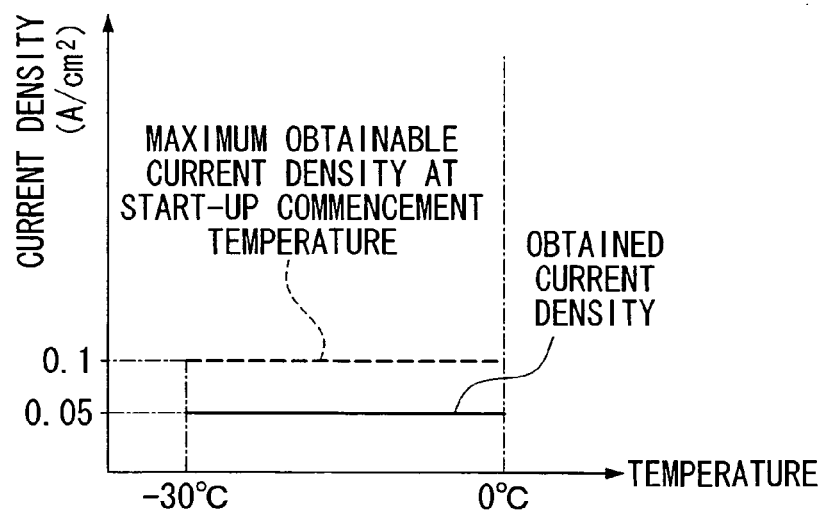
FIG. 11 is a view showing an example of the setting of an obtained current density from a fuel cell stack when startup is conducted at a subzero temperature.
Figure 12:
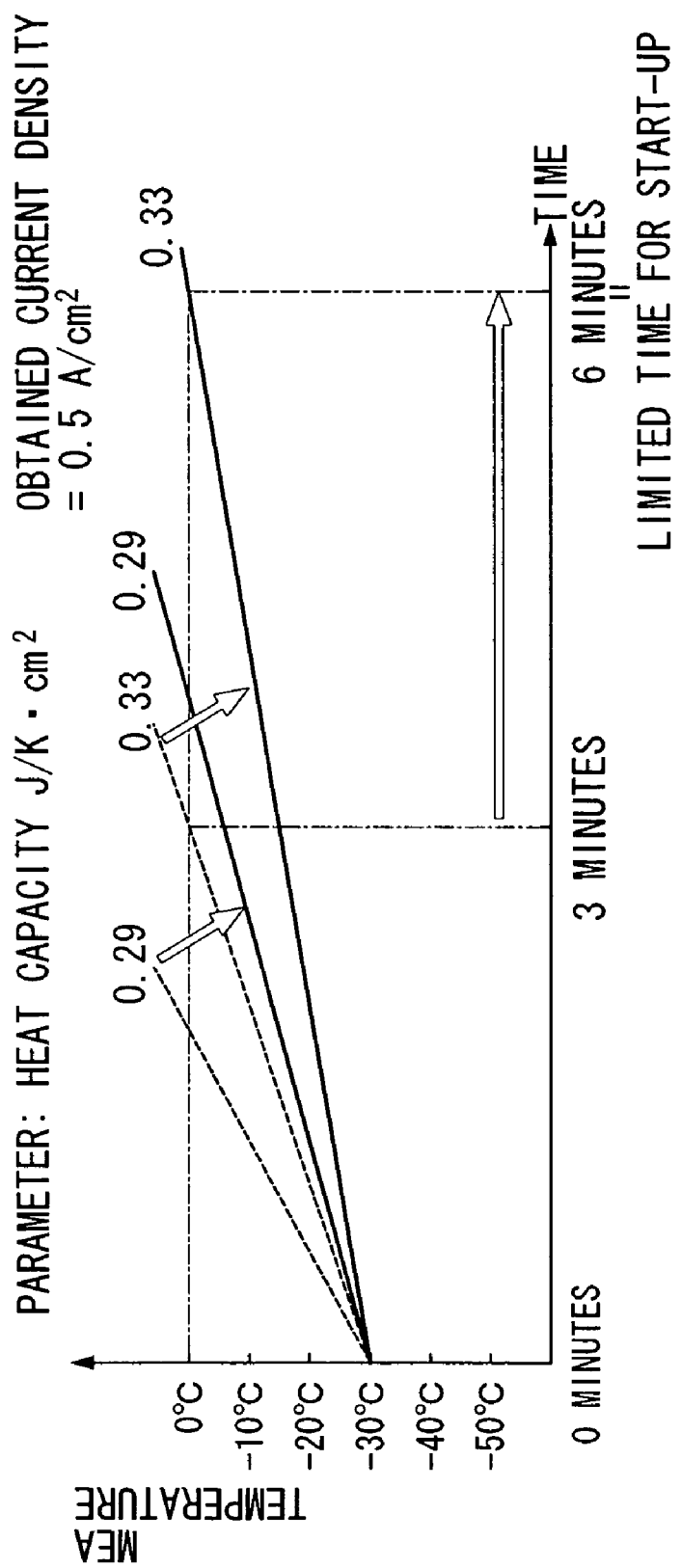
FIG. 12 is a temperature characteristic view of a membrane electrode assembly for explaining the effects of the obtained current density of a fuel cell stack on a limited time for start-up.

When constant current generation was conducted with the start-up commencement temperature at the same −30° C., and, as is shown in FIG. 11, with the obtained current density made smaller than the maximum obtainable current density (for example, 0.05 A/cm$^2$), the temperature increase characteristics were as is shown in FIG. 12.

Namely, because the heat capacity of the single cells 57 is reduced when the obtained current density is reduced, the rate of temperature increase of the power generating section 50 is slower than when the constant current generation was conducted at the maximum obtainable current density (namely, at the time of the temperature characteristics shown in FIG. 10). However, because the quantity of water that is generated by the power generation is less if the obtained current density is reduced, the limited time for start-up is extended beyond when the constant current generation was conducted at the maximum obtainable current density (namely, at the time of the temperature characteristics shown in FIG. 10). As a result, in the cases of a single cell 57 that has been set to the maximum heat capacity (i.e., 0.33 J/K·cm$^2$) and of a single cell 57 that has been set to a heat capacity less than the maximum heat capacity (i.e., 0.29 J/K·cm$^2$), it is possible to raise the temperature of the power generating section 50 of a membrane electrode assembly 54 to 0° C. or more within an extended limited time for start-up.

Figure 13:
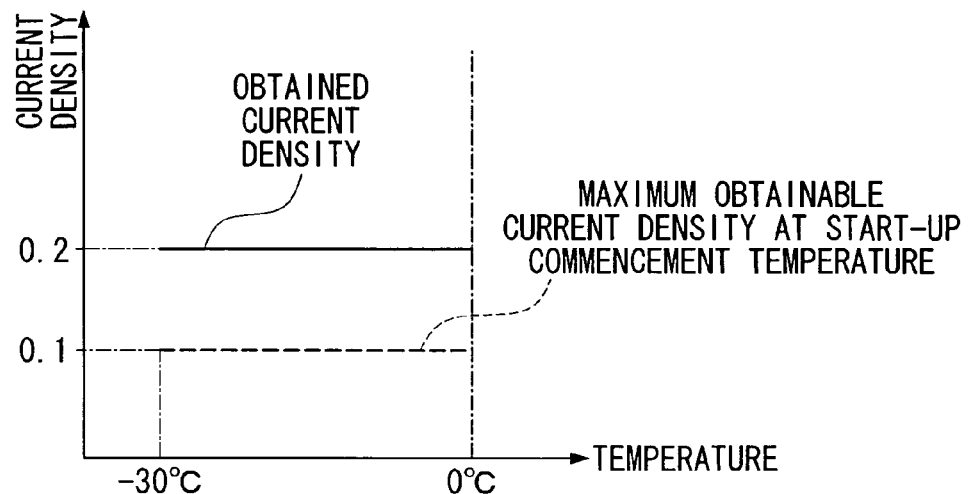
FIG. 13 is a view showing another example of the setting of an obtained current density from a fuel cell stack when startup is conducted at a subzero temperature.
Figure 14:
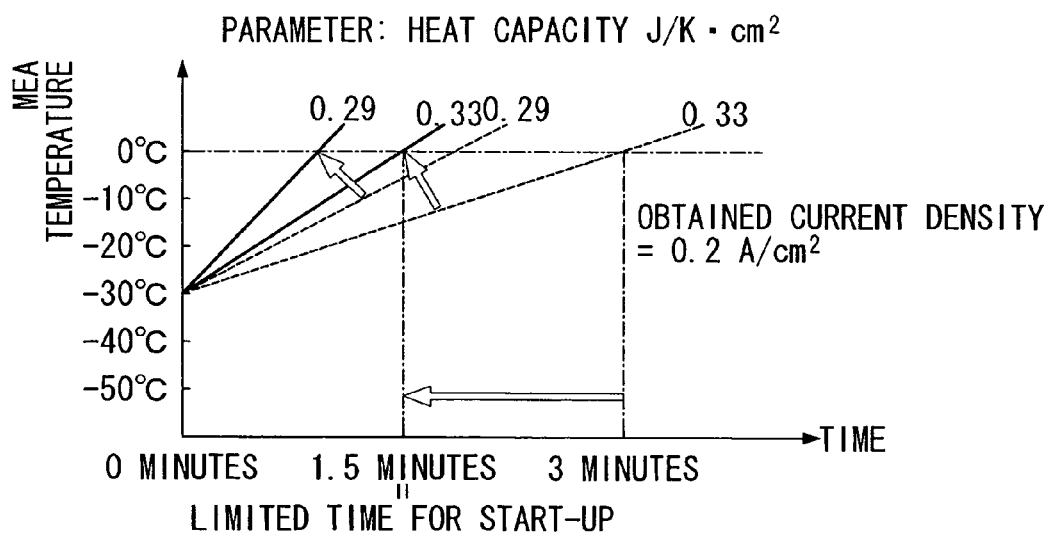
FIG. 14 is a temperature characteristic view of a membrane electrode assembly for explaining the effects of the obtained current density of a fuel cell stack on a limited time for start-up.

Furthermore, when constant current generation was conducted with the start-up commencement temperature at the same −30° C., and, as is shown in FIG. 13, with the obtained current density made greater than the maximum obtainable current density (for example, 0.2 A/cm$^2$), the temperature increase characteristics were as is shown in FIG. 14.

Namely, because the heat capacity of the single cells 57 is increased when the obtained current density is increased, the rate of temperature increase of the power generating section 50 is faster than when the constant current generation was conducted at the maximum obtainable current density (namely, at the time of the temperature characteristics shown in FIG. 10). However, because the quantity of water that is generated by the power generation is greater if the obtained current density is increased, the limited time for start-up becomes shorter than when the constant current generation was conducted at the maximum obtainable current density (namely, at the time of the temperature characteristics shown in FIG. 10). As a result, in the cases of a single cell 57 that has been set to the maximum heat capacity (i.e., 0.33 J/K·cm$^2$) and of a single cell 57 that has been set to a heat capacity less than the maximum heat capacity (i.e., 0.29 J/K·cm$^2$), it is possible to raise the temperature of the power generating section 50 of a membrane electrode assembly 54 to 0° C. or more within a shortened limited time for start-up.

Figure 15:
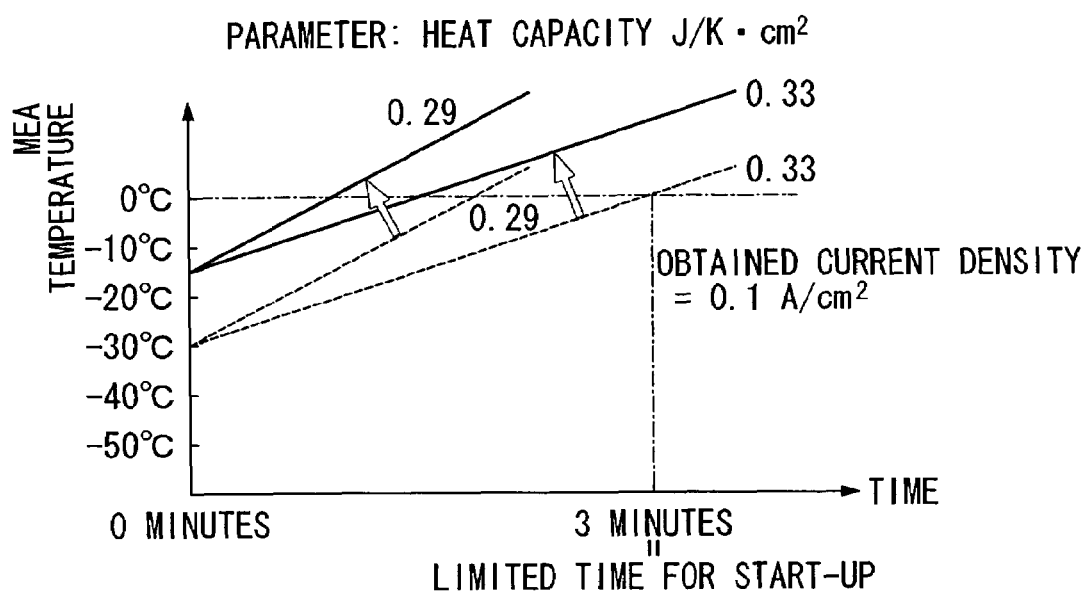
FIG. 15 is a temperature characteristic view of a membrane electrode assembly when the startup commencement temperature is changed.

Furthermore, when constant current generation was conducted with the start-up commencement temperature raised beyond −30° C. (for example to −15° C.), and with the obtained current density set as the maximum obtainable current density, the temperature increase characteristics were as is shown in FIG. 15.

Namely, because the obtained current density is set as the maximum obtainable current density, the limited time for start-up is the same as in the case of the temperature characteristics shown in FIG. 10. In addition, because the capacity of the single cell 57 is also the same, the rate of temperature increase of the power generating section 50 is also the same as in the case of the temperature characteristics shown in FIG. 10. In other words, the temperature characteristics shown in FIG. 15 move exactly in parallel on the high temperature side with the temperature characteristics shown in FIG. 10.

Accordingly, in the cases of a single cell 57 that has been set to the maximum heat capacity (i.e., 0.33 J/K·cm$^2$) and of a single cell 57 that has been set to a heat capacity less than the maximum heat capacity (i.e., 0.29 J/K·cm$^2$), it is possible to raise the temperature of the power generating section 50 of a membrane electrode assembly 54 to 0° C. or more within the limited time for start-up.

Figure 16:
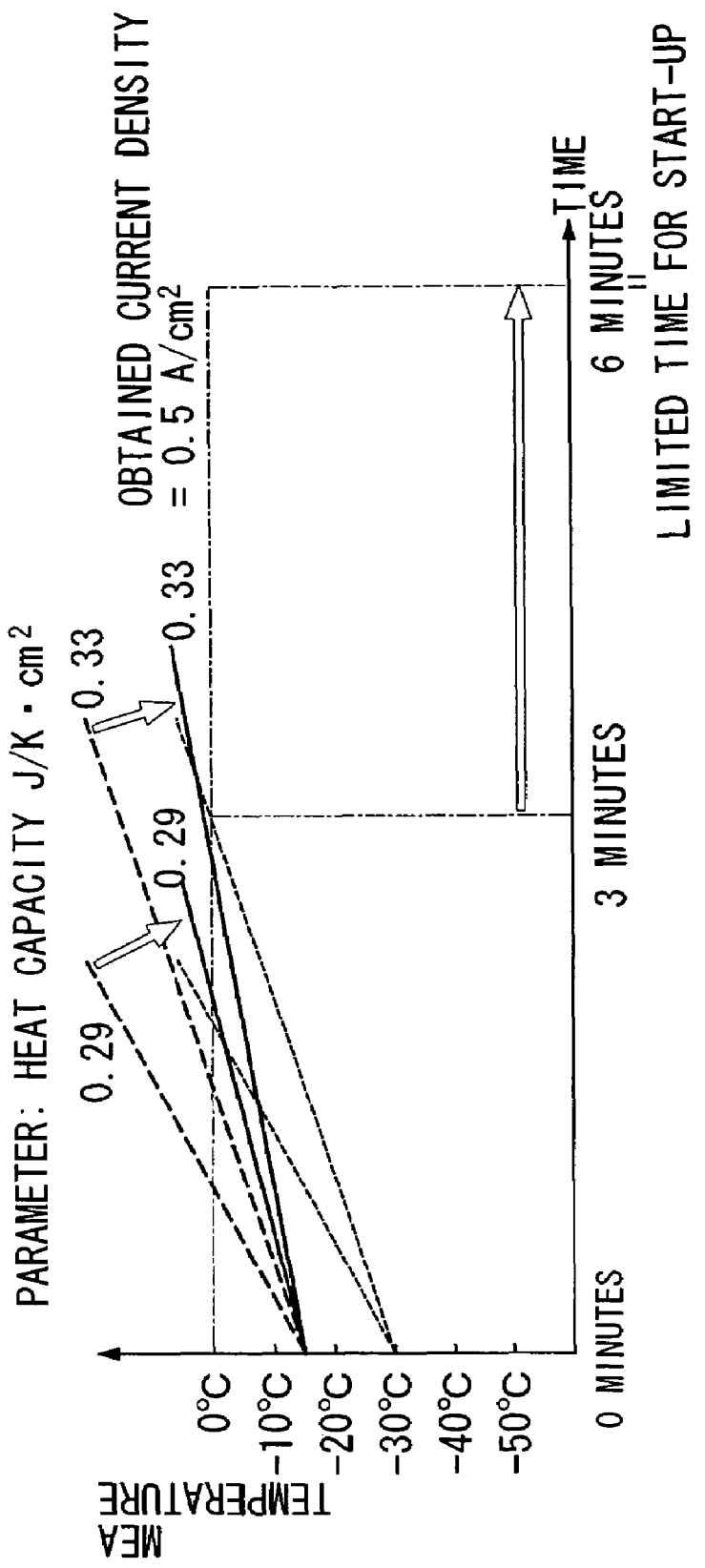
FIG. 16 is a temperature characteristic view of a membrane electrode assembly for explaining the effects of the obtained current density of a fuel cell stack on a limited time for start-up when the startup commencement temperature is changed.

Furthermore, when constant current generation was conducted with the start-up commencement temperature raised beyond −30° C. (for example to −15° C.), and with the obtained current density set at less than the maximum obtainable current density (for example, 0.05 A/cm$^2$), the temperature increase characteristics were as is shown in FIG. 16.

Namely, because the heat capacity of the single cells 57 is reduced when the obtained current density is reduced, the rate of temperature increase of the power generating section 50 is slower than when the constant current generation was conducted at the maximum obtainable current density (namely, at the time of the temperature characteristics shown in FIG. 15). However, because the quantity of water that is generated by the power generation is less if the obtained current density is reduced, the limited time for start-up is extended beyond when the constant current generation was conducted at the maximum obtainable current density (namely, at the time of the temperature characteristics shown in FIG. 15). As a result, in the cases of a single cell 57 that has been set to the maximum heat capacity (i.e., 0.33 J/K·cm$^2$) and of a single cell 57 that has been set to a heat capacity less than the maximum heat capacity (i.e., 0.29 J/K·cm$^2$), it is possible to raise the temperature of the power generating section 50 of a membrane electrode assembly 54 to 0° C. or more within an extended limited time for start-up.

Figure 17:
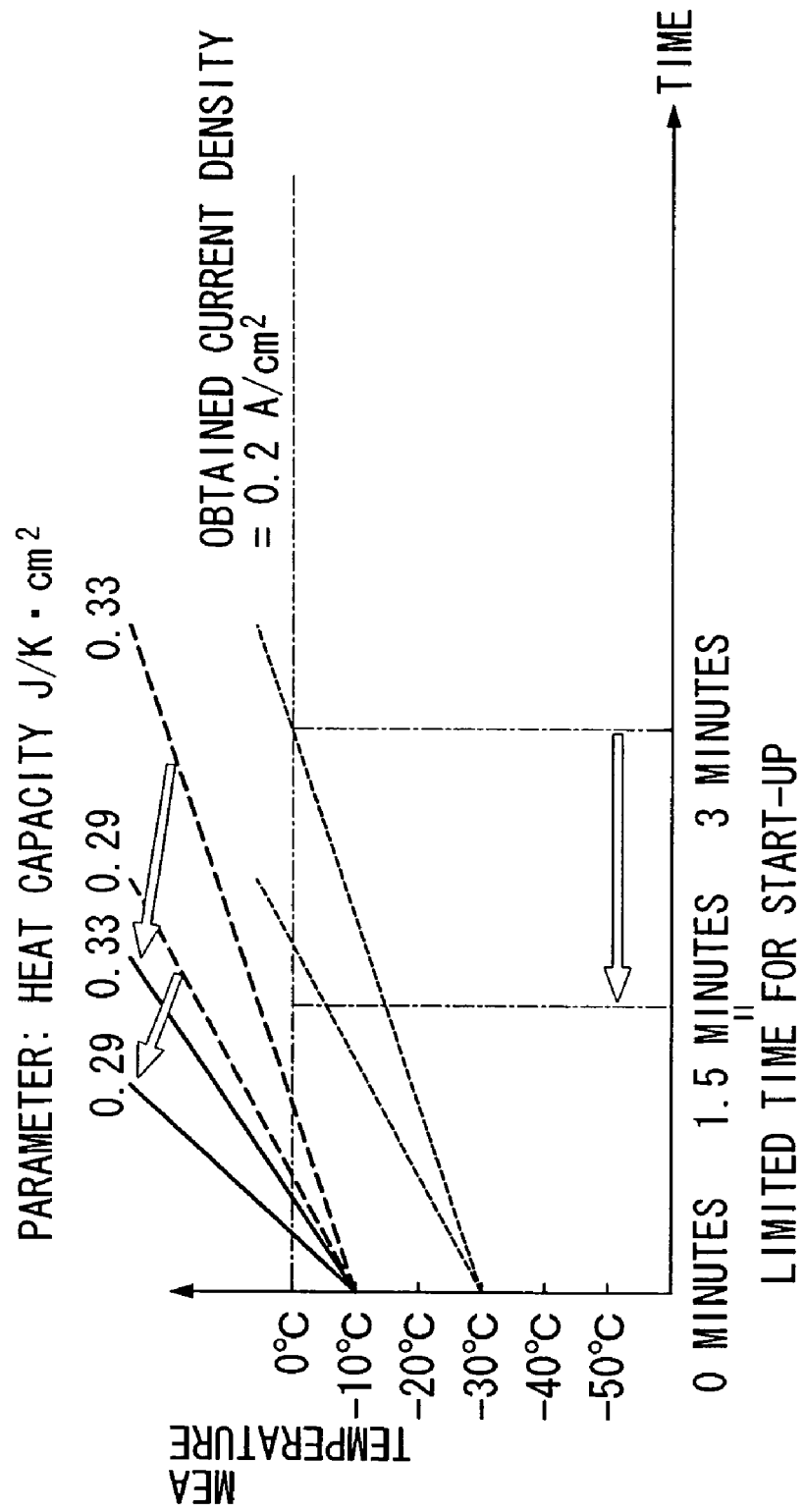
FIG. 17 is a temperature characteristic view of a membrane electrode assembly for explaining the effects of the obtained current density of a fuel cell stack on a limited time for start-up when the startup commencement temperature is changed.

Furthermore, when constant current generation was conducted with the start-up commencement temperature raised beyond −30° C. (for example to −15° C.), and with the obtained current density set at greater than the maximum obtainable current density (for example, 0.2 A/cm$^2$), as is shown in FIG. 13, the temperature increase characteristics were as is shown in FIG. 17.

Namely, because the heat capacity of the single cells 57 is increased when the obtained current density is increased, the rate of temperature increase of the power generating section 50 is faster than when the constant current generation was conducted at the maximum obtainable current density (namely, at the time of the temperature characteristics shown in FIG. 15). However, because the quantity of water that is generated by the power generation is greater if the obtained current density is increased, the limited time for start-up becomes shorter than when the constant current generation was conducted at the maximum obtainable current density (namely, at the time of the temperature characteristics shown in FIG. 15). As a result, in the cases of a single cell 57 that has been set to the maximum heat capacity (i.e., 0.33 J/K·cm$^2$) and of a single cell 57 that has been set to a heat capacity less than the maximum heat capacity (i.e., 0.29 J/K·cm$^2$), it is possible to raise the temperature of the power generating section 50 of a membrane electrode assembly 54 to 0° C. or more within a shortened limited time for start-up.

In this way, if the heat capacity per unit area in the heat generating section 50 of the single cells 57 is set to the maximum heat capacity or less, then provided that the start-up commencement temperature does not go below the start-up commencement temperature that was set in advance when the heat capacity was determined, even if the obtained current density is increased or decreased relative to the maximum obtainable current density, it is still possible to raise the temperature of the power generating section 50 of a membrane electrode assembly 54 in the single cells 57 to 0° C. or more within the limited time for start-up.

However, if the obtained current density is made too small, the quantity of discharge heat that is discharged to the header 70 and to the outside from the power generating section 50 exceeds the quantity of heat generated in the power generating section 50, and it is not possible to raise the temperature of the membrane electrode assembly 54 to 0° C. or more within the limited time for start-up so that power generation cannot be maintained. Therefore, the minimum current density necessary to compensate for the discharged heat should be set as the lower limit value for the obtained current density, and control must be performed such that the obtained current density is held at or above this lower limit value.

Therefore, as described above, it was decided to control the output of the fuel cell stack 1 such that the output current of the fuel cell stack 1 is equal to or more than the minimum current necessary to compensate for the discharged heat even when the fuel cell stack 1 is started up at a subzero temperature with the heat capacity of the power generating section 50 set to the maximum heat capacity or less.

Figure 18:
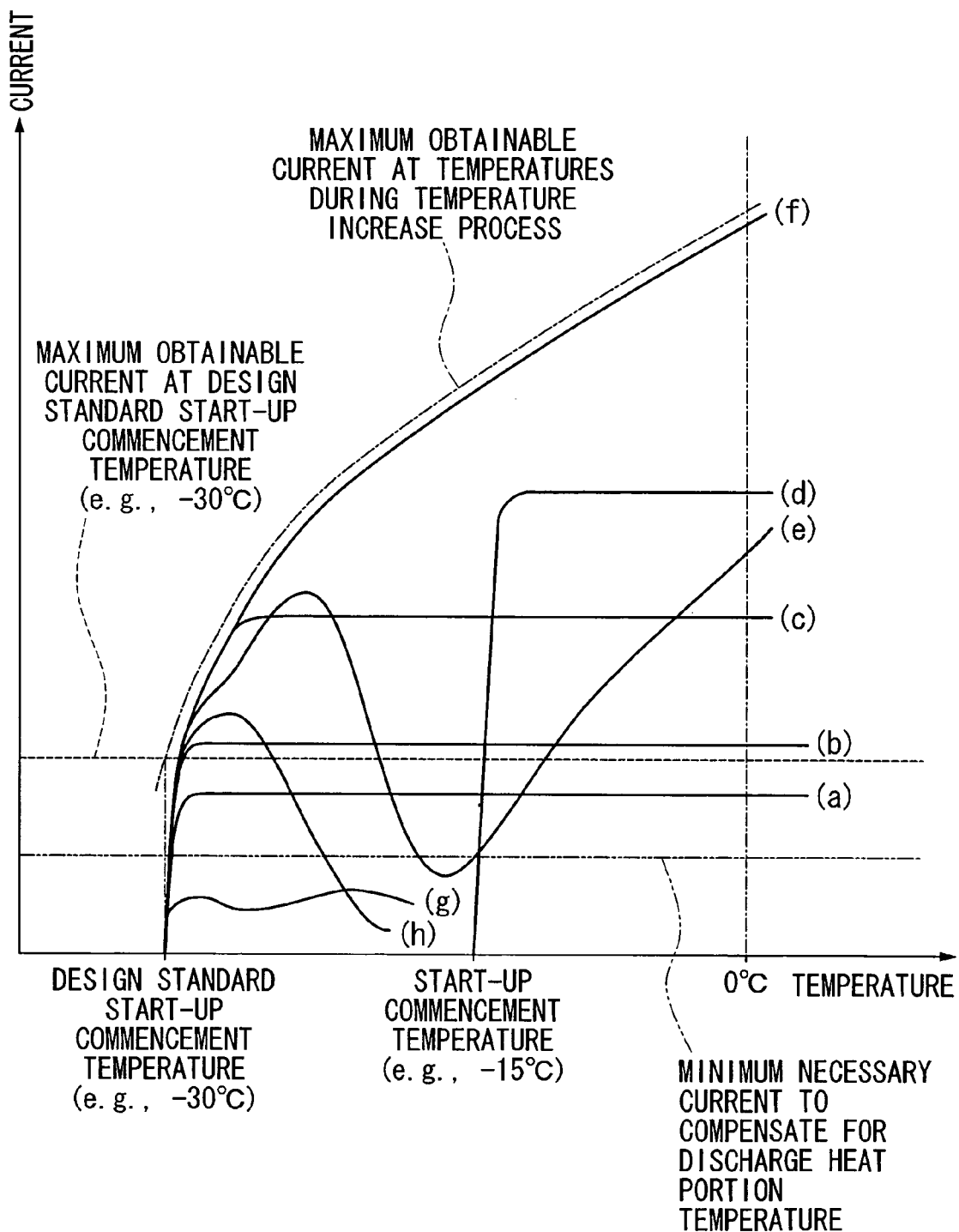
FIG. 18 is a view showing changes in an obtained current when a fuel cell stack is started up at a subzero temperature.

FIG. 18 shows specific examples of obtained current control when the fuel cell stack 1 is started up at a subzero temperature. In FIG. 18, the obtained current from the fuel cell stack 1 is on the vertical axis, and the obtained current density is formed by a value obtained by dividing the obtained current by the surface area of the power generating section 50. Moreover, in FIG. 18, the single dot chain line is a line connecting the maximum obtainable currents at each temperature in the temperature rising process, and the obtained current does not exceed this regardless of the mode of operation of the fuel cell stack 1. Furthermore, the double dot chain line in FIG. 18 shows the average of the minimum current value necessary (i.e., the minimum necessary current) to complement the discharged heat, while the broken line in FIG. 18 shows the maximum obtainable current that corresponds to the maximum obtainable current density at the start-up commencement temperature (for example, −30° C.) that was standard when the maximum heat capacity of the single cells 57 was being set.

In FIG. 18, reference symbols (a) to (f) show examples of the control of a suitable obtained current for subzero start-up of the fuel cell stack 1.

The examples of obtained current control indicated by reference symbols (a) to (c) are all cases in which the start-up of the fuel cell stack 1 is commenced from the design standard start-up commencement temperature (i.e., −30° C.), and show examples in which a control method is employed that maintains the obtained current at a predetermined current that is equal to or greater than the minimum necessary current. This control method will be referred to below as constant current generation.

The example of obtained current control indicated by reference symbol (d) commences start-up of the fuel cell stack 1 with a temperature higher (for example, −15° C.) than the design standard start-up temperature (i.e., −30° C.) set as the start-up commencement temperature, and shows an example in which a control method is employed that conducts constant current generation with the obtained current set to the minimum necessary current or greater.

The example of obtained current control indicated by reference symbol (e) is an example in which control is performed such that when the obtained current temporarily drops for only a brief period below the minimum necessary current, it is immediately restored to the minimum necessary current or greater. In this case, even if the temperature of the membrane electrode assemblies 54 is lowered as a result of the heat discharge during the time the obtained current is below the minimum necessary current, the temperature of the membrane electrode assemblies 54 can be restored by rapidly increasing the quantity of heat that is generated after the obtained current has been restored to the minimum necessary current or greater, and it is possible to raise the temperature of the membrane electrode assemblies 54 to 0° C. or greater within the limited time for start-up.

The example of obtained current control indicated by reference symbol (f) is an example in which a control method is employed that maintains the output voltage of the fuel cell stack 1 at a predetermined voltage value. This control method is referred to below as constant voltage generation. Note that the example of obtained current control indicated by reference symbol (f) is an example in which control is conducted such that the obtained current has a value that is close to the maximum obtainable current at each temperature in the temperature rising process.

In contrast to this, in FIG. 18, in a case in which the obtained current stays continuously at less than the minimum necessary current from the commencement of start-up, as is shown in an example indicated by reference symbol (g), or in a case in which the obtained current stays at the minimum necessary current or greater for a short time after the commencement of start-up but then after a predetermined time stays at less than the minimum necessary current, as is shown in an example indicated by reference symbol (h), the temperature of the power generating section 50 of the membrane electrode assemblies 54 cannot be raised to 0° C. or greater within the limited time for start-up, and the fuel cell stack 1 is unable to generate power. Accordingly, when starting up at a subzero temperature, operating the fuel cell stack 1 such that the obtained current changes in the manner shown in the examples indicated by reference symbols (g) or (h) should be avoided.

Figure 19:
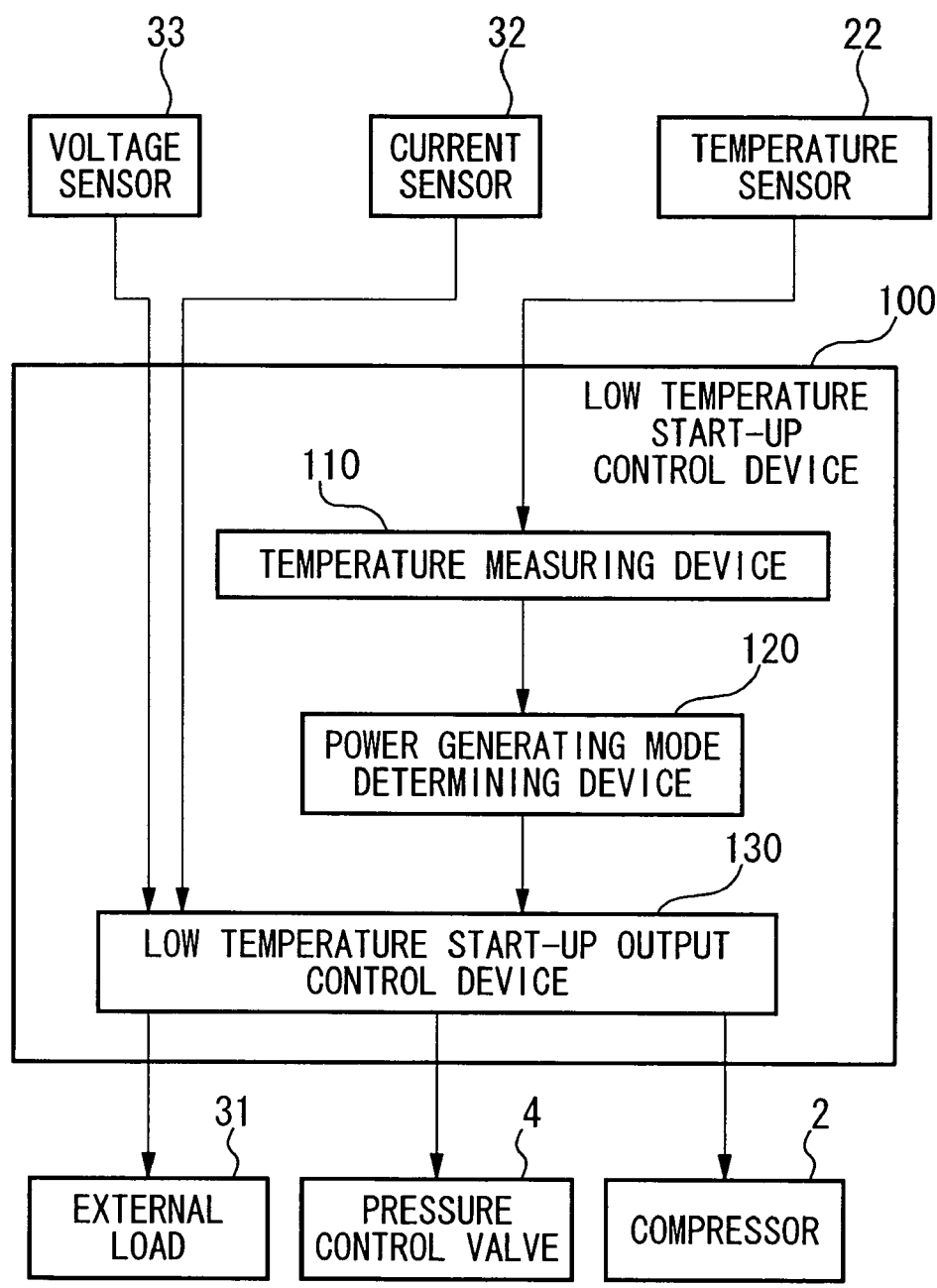
FIG. 19 is a control block diagram showing a method for starting up a fuel cell stack at a subzero temperature according to the present invention.

Next, an example of the control when the fuel cell stack 1 is started up at a subzero temperature will be described in detail in accordance with the control block diagram shown in FIG. 19 and the flowcharts shown in FIGS. 20 to 22. Note that, in the control example described below, the term "output current of the fuel cell stack 1" has the same definition as "obtained current from the fuel cell stack 1".

Firstly, an outline of the subzero start-up control will be described with reference made to the control block diagram shown in FIG. 19.

The fuel cell stack 1 is provided with a low temperature start-up control device 100. The low temperature start-up control device 100 is provided with a temperature measuring device 110, a power generating mode determining device 120, and a low temperature start-up output control device 130.

The temperature measuring device 110 measures the internal temperature inside the fuel cell stack 1 (i.e., the temperature of the membrane electrode assemblies 54) based on output signals from a temperature sensor 22. The power generating mode determining device 120 determines whether start-up should be carried out in normal power generating mode or in low temperature start-up power generating mode based on the internal temperature of the fuel cell stack 1 that has been measured.

When the power generating mode determining device 120 determines that start-up should be conducted in the low temperature start-up power generating mode, the low temperature start-up output control device 130 controls the output from the fuel cell stack 1 such that the output current of the fuel cell stack 1 is equal to or greater than the minimum necessary current required to compensate for the discharged heat using one of the control methods described below in detail, while monitoring output current of the fuel cell stack 1 that has been input from a current sensor 32 and stack voltage that has been input from a voltage sensor 33. The output control of the fuel cell stack 1 is controlled by controlling the supply of reaction gas (i.e., hydrogen gas and air) by controlling at least one of the aperture of a pressure control valve 4 and the operation of the compressor 2, and by controlling the load amount of an external load 31.

Accordingly, the low temperature start-up control device 100 is a control device that raises the temperature of the fuel cell stack 1 from a subzero start-up commencement temperature, while controlling at least one of the flow quantity and pressure of reaction gas that is introduced into the fuel cell stack 1, and at least one of the output current and output voltage of the fuel cell stack 1.

Subzero temperature start-up control will now be described using specific examples.

CONTROL EXAMPLE 1

Constant Current Generation

Figure 20:
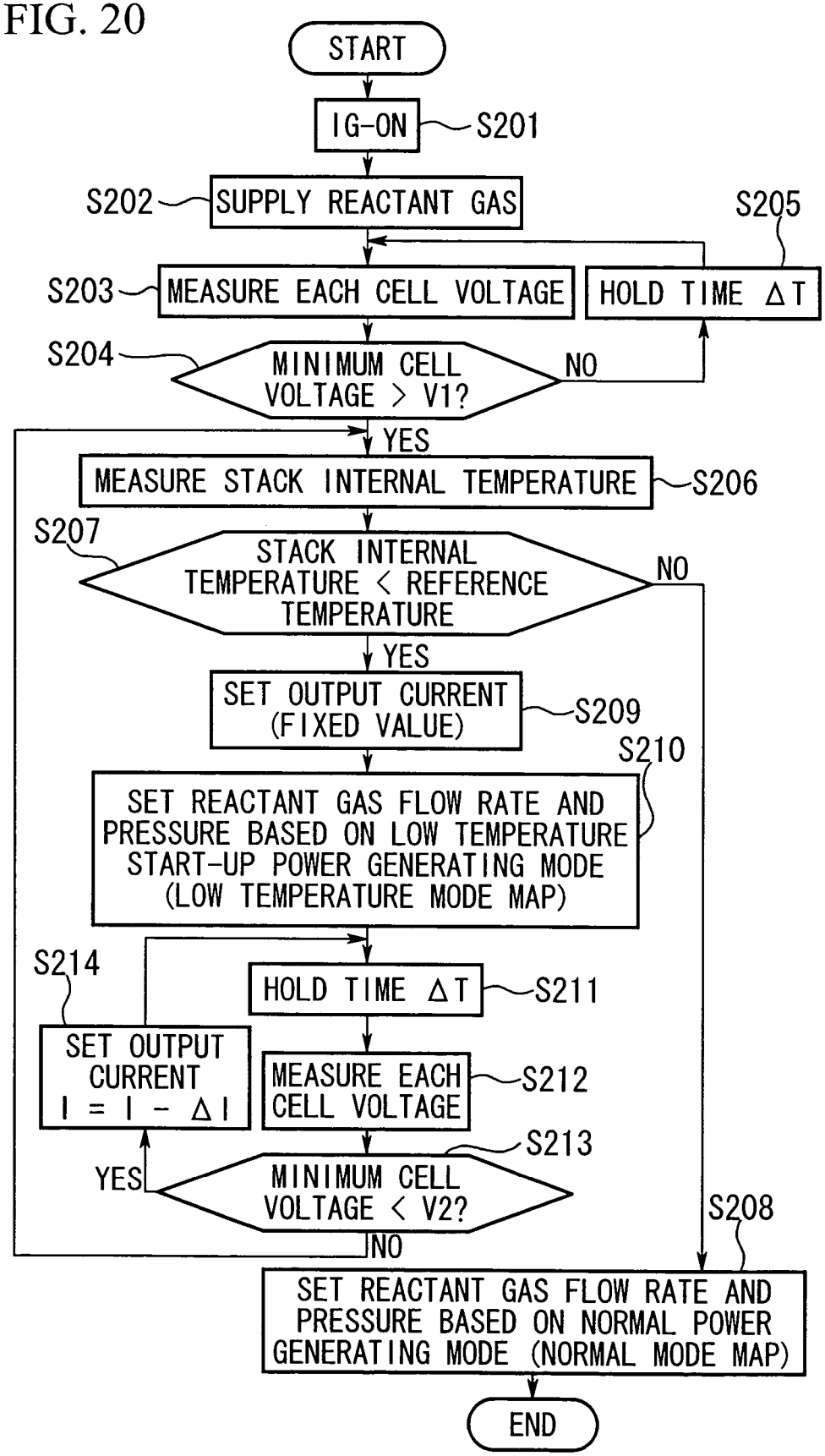
FIG. 20 is a flowchart showing subzero temperature startup control of this fuel cell stack (i.e., control example 1).

The flowchart shown in FIG. 20 shows a start-up control routine when the fuel cell stack 1 is started up by the aforementioned constant current power generation at a subzero temperature. This start-up control routine is executed by the ECU 20.

Firstly, when the ignition switch of a fuel cell vehicle is turned ON (step S201), reaction gas is supplied to the fuel cell stack 1 (step S202). Namely, the compressor 2 is operated and the pressure control valve 4 and the fuel supply control valve 5 are opened. In addition, air is supplied to the air flow passages 59 and hydrogen gas is supplied to the fuel flow passages 58 of each single cell 57 of the fuel cell stack 1.

Next, the cell voltage of each single cell 57 is measured by the respective voltage sensors 21 (step S203), and a determination is made as to whether or not the lowest cell voltage from among the measured cell voltages is larger than a first threshold voltage V1 that has been set in advance (step S204). Here, the first threshold voltage V1 is set to the open circuit voltage value at which it is determined that the reaction gas has permeated to the electrodes 52 and 53 of the membrane electrode assemblies 54 in each single cell 57.

If the result of the determination in step S204 is NO (i.e., the lowest cell voltage≦V1), then because the reaction gas has not yet permeated to the electrodes 52 and 53 of the membrane electrode assemblies 54 in each single cell 57, after a predetermined time ΔT has been maintained (step S205), the routine returns to step S203. Namely, the processing of steps S203 to S205 is repeatedly executed until the lowest cell voltage exceeds the first threshold voltage V1.

It is desirable that the predetermined time ΔT in step S205 and the predetermined time ΔT in step S211 (described below) are both set to as short a time as possible within a controllable range.

If the result of the determination in step S204 is YES (i.e., the lowest cell voltage>V1), the routine proceeds to step S206, and the internal temperature of the fuel cell stack 1 is measured. Here, the internal temperature of the fuel cell stack 1 is the temperature of the membrane electrode assemblies 54 in the single cell 57 that is measured by the temperature sensor 22.

A determination is then made as to whether or not the internal temperature of the fuel cell stack 1 that was measured in step S206 is smaller than a previously set reference temperature (step S207). This reference temperature is set to a temperature at which the fuel cell stack 1 is able to generate power consistently at a reaction gas flow rate and pressure that are set based on a normal mode map (namely, a warm-up completion temperature).

If the result of the determination in step S207 is NO (i.e., the stack internal temperature≧reference temperature), then because start-up is possible in normal power generating mode, the reaction gas flow rate and pressure are set in accordance with the required power based on normal mode map (step S208), and at least one of the number of revolutions of the compressor 2 and the aperture of the pressure control valve 4 are controlled such that the set reaction gas flow rate and pressure are achieved. The processing of the routine is then temporarily ended.

If, however, the result of the determination in step S207 is YES, (i.e., the stack internal temperature<reference temperature), then because it is necessary to perform the start-up in low temperature start-up power generating mode, the output current of the fuel cell stack 1 is set to a fixed value (step S209), and thereafter the reaction gas flow rate and pressure are set based on a low temperature mode map (step S210), and at least one of the number of revolutions of the compressor 2 and the aperture of the pressure control valve 4 are controlled such that the set reaction gas flow rate and pressure are achieved. Note that the fixed current value set in step S209 is equal to or more than the minimum required current, and may be set always to a fixed value regardless of the start-up commencement temperature. Alternatively, the fixed current value may be altered in accordance with the start-up commencement temperature. If the fixed current value is altered in accordance with the start-up commencement temperature, then control such as that shown by (d) in FIG. 18 becomes possible. In addition, in the low temperature mode map, the reaction gas flow rate and pressure are set greater than in the normal mode map when a comparison is made for the same power requirements.

Next, after the operation has continued for a predetermined time ΔT at the reaction gas flow rate and pressure that were set in step S210 (step S211), the cell voltage of each single cell 57 is measured by the respective voltage sensors 21 (step S212), and a determination is made as to whether or not the lowest cell voltage from among the measured cell voltages is less than a second threshold voltage V2 that has been set in advance (step S213). Here, the second threshold voltage V2 is set to a voltage threshold below which damage will occur in the membrane electrode assemblies 54 (i.e., to a cell voltage lower limit value).

If the result of the determination in step S213 is YES (i.e., the lowest cell voltage<V2), the output current I is reduced by the amount ΔI (step S214) and the routine returns to step S211.

It is possible to increase the voltage by reducing the output current I. In addition, when the lowest cell voltage is less than the second threshold voltage V2, the processing of steps S211 to S214 are repeatedly executed until the lowest cell voltage equals or exceeds the second threshold voltage V2.

If the result of the determination in step S213 is NO (i.e., the lowest cell voltage≧V2), then the routine returns to step S206 without either decreasing or increasing the output current I. Namely, the processing of step S206, step S207, and steps S209 to S214 is repeated until the internal temperature of the fuel cell stack 1 equals or exceeds the reference temperature.

By performing control in this manner, in a subzero temperature start-up, the fuel cell stack 1 can be operated with the output current I from the fuel cell stack 1 made substantially uniform with the current value set in step S209. Here, because the output current I is set equal to or more than the minimum required current, it is possible to compensate for the discharged heat from the fuel cell stack 1, it is also possible to reliably raise the temperature of the power generating section 50 to 0° C. or greater within the limited time for start-up using only the self generated heat that is created by the power generation of the fuel cell stack 1, and it is also possible to reliably transit to normal power generating mode while maintaining power generation. Accordingly, it is possible to prevent the fuel cell stack 1 from degenerating midway through start-up into a state in which is unable to generate power due to freezing of generated water, and power generation by the fuel cell stack can be continuously maintained.

Note that in this control example 1, the temperature measuring device 110 is formed by the temperature sensor 22 and the ECU 20 executing the processing of step S206, the power generating mode determining device 120 is achieved by the ECU 20 executing the processing of step S207, and the low temperature start-up output control device 130 is achieved by the ECU 20 executing the processing of steps S209 to S211. Moreover, in control example 1, the temperature measuring device 110, the power generating mode determining device 120, and the low temperature start-up output control device 130 constitute the low temperature start-up control device 100 that raises the temperature of the fuel cell stack 1 from a subzero start-up commencement temperature while controlling at least one of the flow rate and pressure of reaction gas that is introduced into the fuel cell stack 1 and controlling output current of the fuel cell stack 1.

CONTROL EXAMPLE 2

Figure 21:
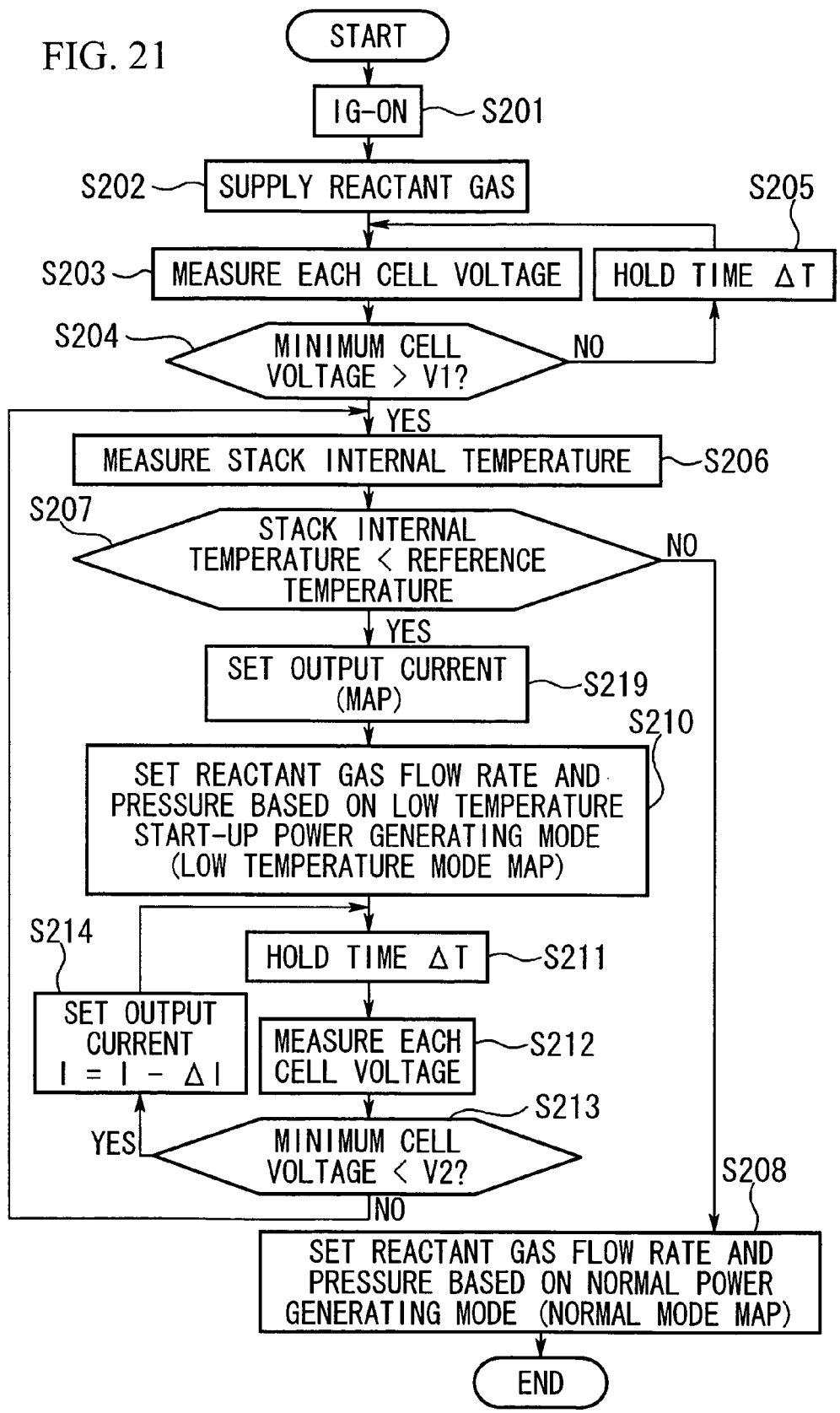
FIG. 21 is a flowchart showing subzero temperature startup control of this fuel cell stack (i.e., control example 2).

The flowchart shown in FIG. 21 shows a start-up control routine when output current of the fuel cell stack 1 is controlled using suitable current values that are set between the minimum required current and the maximum obtainable current at a subzero start-up. This start-up control routine is executed by the ECU 20.

The flowchart shown in FIG. 21 is basically the same as the flowchart shown in FIG. 20, and only varies in step S219 which corresponds to step S209 in the flowchart in FIG. 20. The same step numbers are given to processing in control example 2 that is the same as that in control example 1, and a description thereof is omitted, only step S219 is described.

In control example 2, in step S219, the output current of the fuel cell stack 1 is set while referring to an output current map (not shown) that uses, for example, the internal temperature of the fuel cell stack 1 as a parameter. Note that the output current map is created in advance based on experiment data or the like. The output current map may be set such that the output current increases in steps. Alternatively, depending on how the map is made, the output current can be made to change at a value that is close to the maximum obtainable current at a temperature during temperature increase process.

In the case of control example 2, in a subzero start-up, the fuel cell stack 1 can be operated while the output current is changed in accordance with an output current map that has been previously created, and if the output current map is set such that the output current increases by steps, it is possible to raise the temperature of the power generating section 50 more rapidly than by the constant current power generation of control example 1.

Note that in control example 2, the temperature measuring device 110 is formed as a result of the temperature sensor 22 and the ECU 20 executing the processing of step S206, the power generating mode determining device 120 is achieved by the ECU 20 executing the processing of step S207, and the low temperature start-up output control device 130 is achieved by the ECU 20 executing the processing of steps S219, S210 and S211. Moreover, in control example 2, the temperature measuring device 110, the power generating mode determining device 120, and the low temperature start-up output control device 130 constitute the low temperature start-up control device 100 that raises the temperature of the fuel cell stack 1 from a subzero start-up commencement temperature while controlling at least one of the flow rate and pressure of reaction gas that is introduced into the fuel cell stack 1 and controlling output current of the fuel cell stack 1.

CONTROL EXAMPLE 3

Constant Voltage Generation

Figure 22:
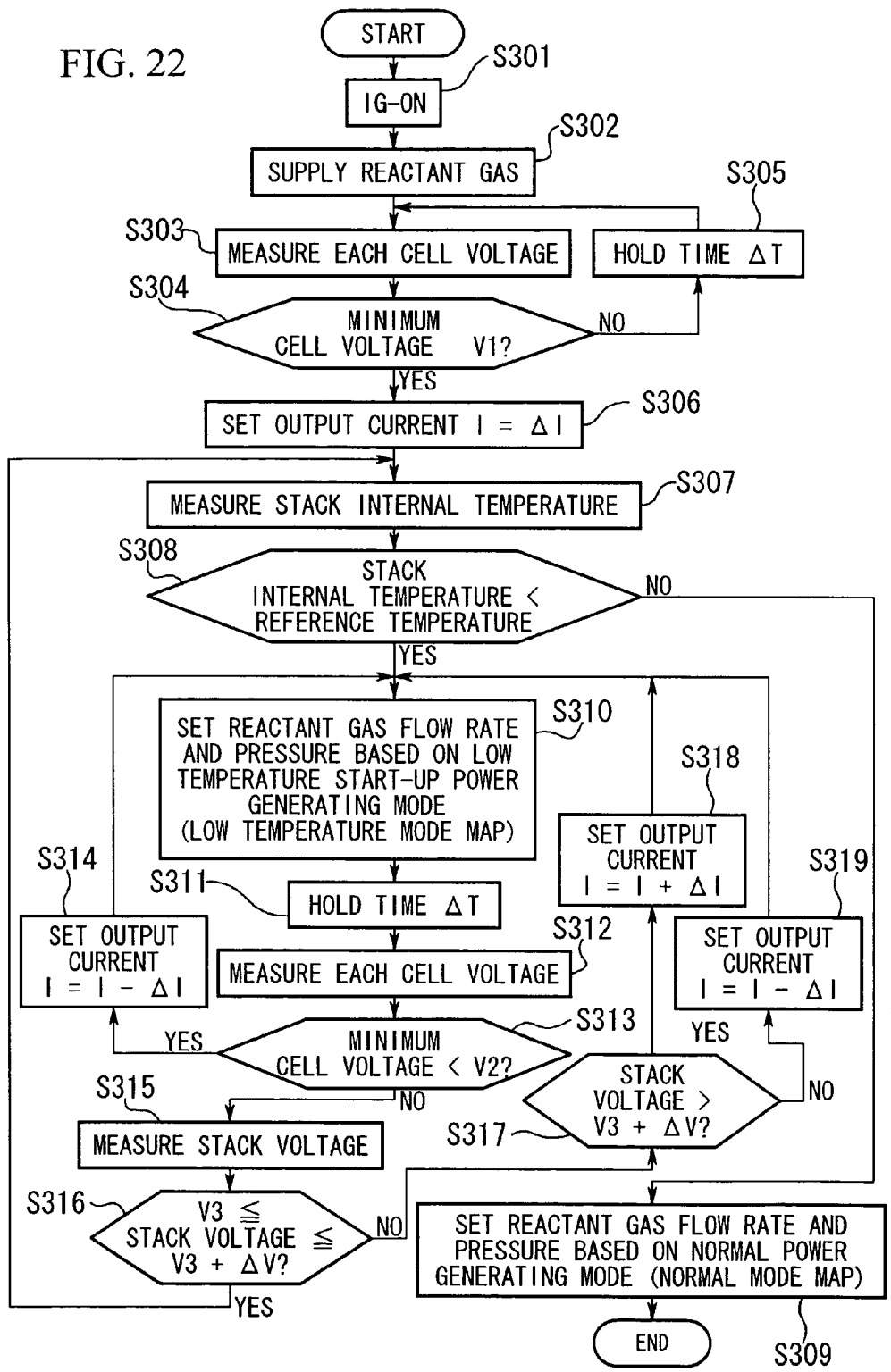
FIG. 22 is a flowchart showing subzero temperature startup control of this fuel cell stack (i.e., control example 3).

The flowchart shown in FIG. 22 shows a start-up control routine when the fuel cell stack 1 is started up by the aforementioned constant voltage power generation at a subzero temperature. This start-up control routine is executed by the ECU 20.

Firstly, when the ignition switch of a fuel cell vehicle is turned ON (step S301), reaction gas is supplied to the fuel cell stack 1 (step S302). Namely, the compressor 2 is operated and the pressure control valve 4 and the fuel supply control valve 5 are opened. In addition, air is supplied to the air flow passages 59 and hydrogen gas is supplied to the fuel flow passages 58 of each single cell 57 of the fuel cell stack 1.

Next, the cell voltage of each single cell 57 is measured by the respective voltage sensors 21 (step S303), and a determination is made as to whether or not the lowest cell voltage from among the measured cell voltages is larger than a first threshold voltage V1 that has been set in advance (step S304). Here, the first threshold voltage V1 is set to the open circuit voltage value at which it is determined that the reaction gas has permeated to the electrodes 52 and 53 of the membrane electrode assemblies 54 in each single cell 57.

If the result of the determination in step S304 is NO (i.e., the lowest cell voltage≦V1), then because the reaction gas has not yet permeated to the electrodes 52 and 53 of the membrane electrode assemblies 54 in each single cell 57, after a predetermined time ΔT has been maintained (step S305), the routine returns to step S303. Namely, the processing of steps S303 to S305 is repeatedly executed until the lowest cell voltage exceeds the first threshold voltage V1.

It is desirable that the predetermined time ΔT in step S305 and the predetermined time ΔT in step S311 (described below) are both set to as short a time as possible within a controllable range.

If the result of the determination in step S304 is YES (i.e., the lowest cell voltage is >V1), ΔI is set for the output current I of the fuel cell stack 1 (step S306), and the internal temperature of the fuel cell stack 1 is measured (step S307). Here, the internal temperature of the fuel cell stack 1 is the temperature of the membrane electrode assemblies 54 in the single cell 57 that is measured by the temperature sensor 22.

A determination is then made as to whether or not the internal temperature of the fuel cell stack 1 that was measured in step S307 is smaller than a previously set reference temperature (step S308). This reference temperature is set to a temperature at which the fuel cell stack 1 is able to generate power consistently at a reaction gas flow rate and pressure that are set based on a normal mode map (namely, a warm-up completion temperature).

If the result of the determination in step S308 is NO (i.e., the stack internal temperature≧reference temperature), then because start-up is possible in normal power generating mode, the reaction gas flow rate and pressure are set in accordance with the required power based on normal mode map (step S309), and at least one of the number of revolutions of the compressor 2 and the aperture of the pressure control valve 4 are controlled such that the set reaction gas flow rate and pressure are achieved. The processing of the routine is then temporarily ended.

If, however, the result of the determination in step S308 is YES, (i.e., the stack internal temperature<reference temperature), then because it is necessary to perform the start-up in low temperature start-up power generating mode, the reaction gas flow rate and pressure are set based on a low temperature mode map (step S310), and at least one of the number of revolutions of the compressor 2 and the aperture of the pressure control valve 4 are controlled such that the set reaction gas flow rate and pressure are achieved. In the low temperature mode map, the reaction gas flow rate and pressure are set greater than in the normal mode map when a comparison is made for the same power requirements.

Next, after the operation has continued for a predetermined time ΔT at the reaction gas flow rate and pressure that were set in step S310 (step S311), the cell voltage of each single cell 57 is measured by the respective voltage sensors 21 (step S312), and a determination is made as to whether or not the lowest cell voltage from among the measured cell voltages is less than a second threshold voltage V2 that has been set in advance (step S313). Here, the second threshold voltage V2 is set to a voltage threshold below which damage will occur in the membrane electrode assemblies 54 (i.e., to a cell voltage lower limit value).

If the result of the determination in step S313 is YES (i.e., the lowest cell voltage<V2), the output current I is reduced by the amount ΔI (step 314) and the routine returns to step S310.

It is possible to increase the voltage by reducing the output current I. In addition, when the lowest cell voltage is less than the second threshold voltage V2, the processing of steps S310 to S314 are repeatedly executed until the lowest cell voltage equals or exceeds the second threshold voltage V2.

If the result of the determination in step S313 is NO (i.e., the lowest cell voltage≧V2), then the current setting of the output current I is maintained and the stack voltage of the fuel cell stack 1 is measured by the voltage sensor 33 (step S315). A determination is then made as to whether or not the measured stack voltage is within a range that is greater than a predetermined voltage V3 and less than "V3+ΔV".

Here, V3 is a predetermined voltage value that is set in advance, and, when the lower limit value is the minimum voltage necessary to operate the fuel cell system, is set to a value that is larger than this lower limit value. ΔV is set, based on the current and voltage characteristics of the fuel cell stack 1, as the amount of change in the voltage when the current changes by ΔI.

In the initial start-up stages, because the output current I is extremely small (I=ΔI at the initial setting in step S306), the voltage is extremely large, and the stack voltage is sufficiently greater than "V3+ΔV". Accordingly, in the beginning of the start-up, the determination in step S316 is NO, and the routine proceeds to step S317.

In step S317, it is determined whether or not the stack voltage is greater than "V3 +ΔV".In the initial stages of the start-up, because the stack voltage is sufficiently greater than "V3+ΔV", the determination in step S317 is YES. In this case, the routine proceeds to step S318 where the output current I is increased by the amount ΔI (i.e., I=I+ΔI), and the routine returns to step S310.

Accordingly, as is shown in FIG. 23, in the beginning of the start-up, the processing of step S318 is repeatedly executed until the stack voltage drops below "V3+ΔV", so that control of the increase of the output current I is continuously conducted.

When the stack voltage drops below "V3+ΔV" but is above the predetermined voltage V3, the determination in step S316 is YES.

When the result of the determination in step S316 is YES (i.e., V3≦stack voltage≦V3+ΔV), the changes in the stack voltage are within a permissible range, and the stack voltage can be regarded as substantially a constant voltage. Therefore, the routine returns to step S307 without the output current being changed.

When the stack voltage drops below the predetermined voltage V3, the determination in step S316 is NO, and, in addition, the determination in step S317 is NO.

When the result of the determination in step S317 is NO, the routine proceeds to step S319 where the output current I is decreased by the amount ΔI (i.e., I=I–ΔI), and the routine returns to step S310.

Accordingly, as is shown in FIG. 23, after the stack voltage has dropped below "V3+ΔV" for the first time, control is conducted to increase the output current I by the amount ΔI each time the stack voltage reaches "V3+ΔV". However, in actual fact, because the amounts ΔT, ΔI, and ΔV are set extremely small, the change is in the form of a gentle curve and is not in the form of steps such as those shown in FIG. 23.

By conducting control as is described above, the fuel cell stack 1 can be operated with the output voltage from the fuel cell stack 1 made substantially uniform with the predetermined voltage V3. In addition, it is possible to reliably raise the temperature of the power generating section 50 to 0° C. or greater within the limited time for start-up using only the self generated heat that is created by the power generation of the fuel cell stack 1, and it is also possible to reliably transit to normal power generating mode while maintaining power generation. Accordingly, it is possible to prevent the fuel cell stack 1 from degenerating midway through start-up into a state in which is unable to generate power due to the freezing of generated water, and power generation by the fuel cell stack can be continuously maintained.

Note that in this control example 3, the temperature measuring device 110 is formed by the temperature sensor 22 and the ECU 20 executing the processing of step S307, the power generating mode determining device 120 is achieved by the ECU 20 executing the processing of step S308, and the low temperature start-up output control device 130 is achieved by the ECU 20 executing the processing of steps S306, S310, S311, S315, S316, and S318. Moreover, in control example 3, the temperature measuring device 110, the power generating mode determining device 120, and the low temperature start-up output control device 130 constitute the low temperature start-up control device 100 that raises the temperature of the fuel cell stack 1 from a subzero start-up commencement temperature while controlling at least one of the flow rate and pressure of reaction gas that is introduced into the fuel cell stack 1 and while controlling output voltage of the fuel cell stack 1.

Figure 24:
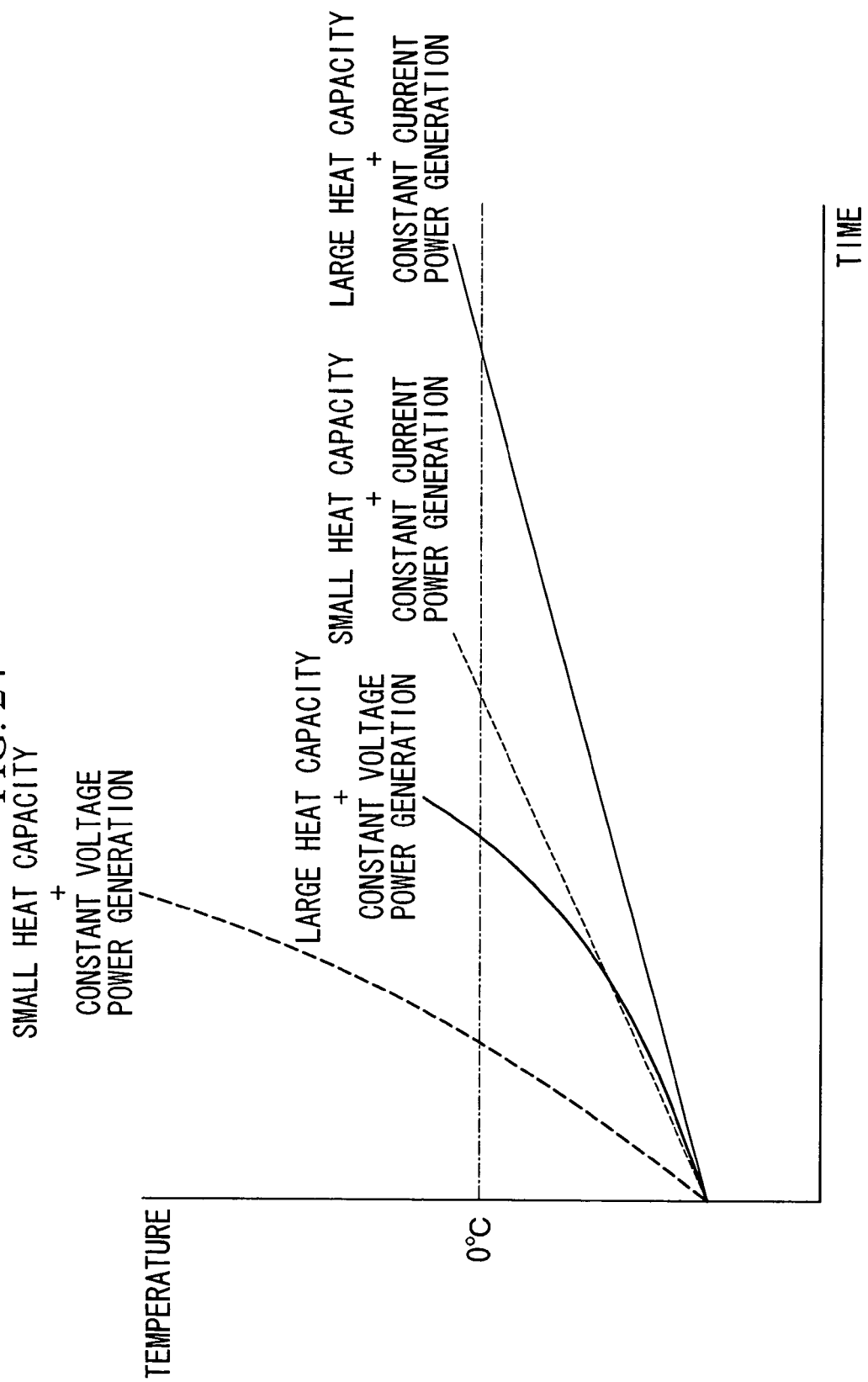
FIG. 24 is a view showing an internal temperature change of a fuel cell stack during subzero temperature startup using control example 1 and control example 3.

FIG. 24 gives the results of an experiment and shows a comparison between changes in the internal temperature of the fuel cell stack 1 in subzero temperature start-ups using the above described control example 1 (i.e., constant current power generation) and control example 3 (i.e., constant voltage power generation) when the start-up commencement temperatures were identical. The experiment was conducted using the respective control examples for a case in which the heat capacity of the power generating section of the fuel cell stack 1 was large and for a case in which it was small.

From the results from this experiment it can be seen that, if the comparison is made at the same heat capacity, the subzero temperature start-up method that uses constant voltage power generation has a greater temperature increase effect (i.e., a more rapid temperature increase) than the subzero temperature start-up method that uses constant current voltage generation. Moreover, this tendency was more marked when the heat capacity was small than when the heat capacity was large.

Accordingly, in a subzero temperature start-up of the fuel cell stack 1, it is preferable that the heat capacity of the power generating section 50 is made small and that the operation of the fuel cell stack 1 is controlled using constant voltage power generation.

It should be noted that in the subzero temperature start-up methods for a fuel cell stack described above, it is assumed that the fuel cell stack 1 is being started up in a state in which the coolant flow passages 60 of the single cells 57 that constitute the fuel cell stack 1 have been filled with coolant. Accordingly, also when setting the heat capacity per unit area of the power generating section 50 of the single cells 57 to less than the maximum heat capacity, it is set as a value that includes the heat capacity of the coolant that is held in the coolant flow passages 60. In this case, as is described above, the quantity of coolant that is held in the single cells 57 has a considerable effect on the heat capacity of the power generating section 50.

Therefore, as a subzero temperature start-up method for a fuel cell stack, by placing the fuel cell stack 1 during start-up in a state in which there is no coolant in the coolant flow passages 60, the heat capacity per unit area of the power generating section 50 of the single cells 57 during start-up is set to less than the maximum heat capacity, and, in this state, by performing the same controls as in each of the above described control examples 1 to 3, it becomes possible to control the output from the fuel cell stack 1 such that the output current of the fuel cell stack 1 becomes equal to or greater than the minimum necessary current that is required to compensate for the discharge heat quantity, and it becomes possible to start up the fuel cell stack 1.

Namely, by using metal separators for the separators 55, 56, and 64 of the fuel cell stack 1, and by further removing the coolant from the coolant flow passages 60 at the time of a subzero temperature start-up, the heat capacity of the fuel cell stack 1 can be rapidly decreased.

It is also possible when a subzero temperature start-up is performed in this way to reliably raise the temperature of the power generating section 50 to 0° C. or greater within the limited time for start-up using only the self generated heat that is created by the power generation of the fuel cell stack 1, and it is possible to reliably transit to normal power generating mode while maintaining power generation. Accordingly, it is possible to prevent the fuel cell stack 1 from degenerating midway through start-up into a state in which is unable to generate power due to freezing of generated water, and power generation by the fuel cell stack can be continuously maintained.

In this case, because it is presupposed that the fuel cell stack 1 is placed in a state in which there is no coolant in the coolant flow passages 60 during start-up, if the heat capacity per unit area of the power generating section 50 of the single cells 57, in a state in which no coolant is held in the coolant flow passages 60, is less than the maximum heat capacity, then because, in a state in which coolant is held in the coolant flow passages 60, the heat capacity per unit area of the power generating section 50 of the single cells 57 is able to exceed the maximum heat capacity, the degree of freedom when designing the single cells 57 is increased.

Note that the timing at which the coolant is removed from the coolant flow passages 60 is not restricted to when the fuel cell system is stopped, and it is also possible to form a fuel cell system in which the external temperature can be measured, and in which the coolant can be automatically removed at the point in time when the measured external temperature is on the verge of the coolant freezing temperature. Moreover, the timing at which the coolant is reintroduced into the coolant flow passages 60 can be determined in accordance with the internal temperature inside the fuel cell stack 1 and with the rate of temperature increase.

ADDITIONAL EMBODIMENTS

It is to be understood that the present invention is not limited to the above described embodiments.

For example, the cross sectional waveform of the separators is not limited to the waveforms in the embodiments described above, and a curved waveform may be used or a rectangular cross-sectional configuration whose bends are substantially right angles may be used.

In addition, the above described embodiments center on a description of raising the temperature of the fuel cell stack using self-generated heat, however, this does not preclude the possibility of combining this self-generated heat with external heating such as from a heater at start-up.

The present invention can be used in fuel cells that are mounted in moving bodies such as motor vehicles, or in stationary fuel cells.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A method of starting up at a subzero temperature a solid polymer electrolyte fuel cell, the method comprising the steps of:

providing a solid polymer electrolyte fuel cell stack that is formed by stacking a plurality of layers of separators that are made from metal and have a cross-sectional waveform structure and membrane electrode assemblies having a solid polymer electrolyte membrane and electrodes, the solid polymer electrolyte fuel cell stack also including a space formed between at least a portion of the separators and separators that are placed adjacent to this portion of the separators which is used as a coolant flow passage, wherein the solid polymer electrolyte fuel cell stack has a predetermined heat capacity that is determined based on a preset start-up commencement temperature and on characteristics of the membrane electrode assembly;

supplying a reaction gas to the fuel cell stack so as to obtain electrical current at a subzero temperature;

obtaining self-generated heat due to power generation by the fuel cell stack at a subzero temperature; and raising a temperature of the membrane electrode assemblies to 0° C. or higher before the membrane electrode assemblies become unable to generate power due to freezing of water created by power generation.

2. The method of starting up at a subzero temperature a solid polymer electrolyte fuel cell, according to claim 1, wherein a temperature of the fuel cell stack is raised under a subzero temperature by exclusively using the self-generated heat due to power generation by the fuel cell stack.

3. The method of starting up at a subzero temperature a solid polymer electrolyte fuel cell, according to claim 1, wherein a heat capacity of the fuel cell stack is a predetermined heat capacity value determined such that, when a temperature of the fuel cell stack is raised by using the self-generated heat due to power generation by the fuel cell stack, the temperature of the membrane electrode assemblies reaches 0° C. or higher before the membrane electrode assemblies become unable to generate power due to freezing of water created by power generation.

4. The method of starting up at a subzero temperature a solid polymer electrolyte fuel cell, according to claim 1, wherein a heat capacity value of the fuel cell stack is 0.04 to 0.33 J/K·cm$^2$ per unit area per single cell in a three-dimensional volume that is formed by stacking the electrode portions in a stacking direction.

5. The method of starting up at a subzero temperature a solid polymer electrolyte fuel cell, according to claim 1, wherein a heat capacity value of the fuel cell stack is smaller than a maximum heat capacity value that is determined based on a predetermined start-up commencement temperature and a subzero start-up characteristic of the membrane electrode assemblies, and the subzero start-up characteristic is a length of time from a time when power generation commences at the subzero start-up commencement temperature to a time when a voltage drop occurs.

6. The method of starting up at a subzero temperature a solid polymer electrolyte fuel cell, according to claim 1, wherein a heat capacity value of the fuel cell stack is smaller than a maximum heat capacity value that is determined based on a predetermined start-up commencement temperature and a limited time for start-up in which the membrane electrode assemblies are unable to generate power.

7. The method of starting up at a subzero temperature a solid polymer electrolyte fuel cell, according to claim 1, further comprising controlling an output from the fuel cell stack such that an output current of the fuel cell stack becomes greater than a minimum necessary current that is required to compensate for discharged heat.

8. The method of starting up at a subzero temperature a solid polymer electrolyte fuel cell, according to claim 7, wherein control is performed such that an output current from the fuel cell stack is maintained at a predetermined value.

9. The method of starting up at a subzero temperature a solid polymer electrolyte fuel cell, according to claim 7, further comprising controlling an output current from the fuel cell stack in accordance with a predetermined output current map.

10. The method of starting up at a subzero temperature a solid polymer electrolyte fuel cell, according to claim 7, wherein control is performed such that an output voltage from the fuel cell stack is maintained at a predetermined value.

11. The method of starting up at a subzero temperature a solid polymer electrolyte fuel cell, according to claim 1, wherein, in the fuel cell stack, spaces that are formed between the membrane electrode assemblies and the separators form reaction gas flow passages, spaces that are formed between the separators that have been placed adjacent to each other form coolant flow passages, and a cross-sectional area of the coolant flow passages is smaller than a cross-sectional area of the reaction gas flow passages.

12. The method of starting up at a subzero temperature a solid polymer electrolyte fuel cell, according to claim 1, wherein, in the fuel cell stack, spaces that are formed between the membrane electrode assemblies and the separators form reaction gas flow passages, a portion of a plurality of spaces that are formed between the separators that have been placed adjacent to each other form coolant flow passages, and remaining spaces form air layers.

13. The method of starting up at a subzero temperature a solid polymer electrolyte fuel cell, according to claim 1, wherein the fuel cell stack has first fluid flow passage portions that are formed by stacking a plurality of separators between membrane electrode assemblies that are adjacent to each other, and second fluid flow passage portions that are formed by placing a single separator between membrane electrode assemblies that are adjacent to each other, and wherein, in the first fluid flow passage portions and the second fluid flow passage portions, spaces that are formed between the membrane electrode assemblies and the separators form reaction gas flow passages, and in the first fluid flow passage portions, spaces that are formed between stacked separators form coolant flow passages.

14. A method of starting up at a subzero temperature a solid polymer electrolyte fuel cell, the method comprising the steps of:
providing a solid polymer electrolyte fuel cell stack that is formed by stacking a plurality of layers of metal separators that have a cross-sectional waveform structure and membrane electrode assemblies having a solid polymer electrolyte membrane and electrodes, said fuel cell stack also including a space formed between at least a portion of the separators and separators that are placed adjacent to this portion of the separators which is used as a coolant flow passage;
setting a heat capacity of the fuel cell stack to a predetermined heat capacity value based on a preset subzero start-up commencement temperature and on characteristics of the membrane electrode assemblies such that a temperature of the membrane electrode assemblies is raised to 0° C. or more before the membrane electrode assemblies become unable to generate power when a temperature of the fuel cell stack is raised using self-generated heat that is created as a result of the fuel cell stack generating power;
using the fuel cell stack whose heat capacity has been set to the predetermined heat capacity value; and
controlling an output from the fuel cell stack such that an output current of the fuel cell stack becomes equal to or greater than a minimum necessary current that is required to compensate for discharged heat.

15. The method of starting up at a subzero temperature a solid polymer electrolyte fuel cell, according to claim 14, wherein the predetermined heat capacity value is 0.04 to 0.33 J/K·cm$^2$ per unit area per single cell in a three-dimensional volume that is formed by stacking the electrode portions in a stacking direction.

16. The method of starting up at a subzero temperature a solid polymer electrolyte fuel cell, according to claim 14, wherein control is performed such that an output voltage from the fuel cell stack is maintained at a predetermined value.

17. A method of starting up at a subzero temperature a solid polymer electrolyte fuel cell, the method comprising the steps of:
providing a solid polymer electrolyte fuel cell stack that is formed by stacking a plurality of layers of metal separators that have a cross-sectional waveform structure and membrane electrode assemblies having a solid polymer electrolyte membrane and electrodes, said fuel cell stack also including a space formed between at least a portion of the separators and separators that are placed adjacent to this portion of the separators, which is used as a coolant flow passage, wherein the solid polymer electrolyte fuel cell stack has a predetermined heat capacity that is determined based on a preset start-up commencement temperature and on characteristics of the membrane electrode assembly;
starting up at a subzero temperature the fuel cell stack in a state in which there is no coolant in the coolant flow passages; and
controlling an output from the fuel cell stack such that an output current of the fuel cell stack becomes equal to or greater than a minimum necessary current that is required to compensate for discharged heat.

18. The method of starting up at a subzero temperature a solid polymer electrolyte fuel cell, according to claim 17, wherein control is performed such that an output voltage from the fuel cell stack is maintained at a predetermined value.

19. A system of starting up a fuel cell stack at a subzero temperature comprising:
a fuel cell stack that is formed by stacking a plurality of layers of metal separators that have a cross-sectional waveform structure and membrane electrode assemblies having a solid polymer electrolyte membrane and electrodes; and a low temperature start-up control device that raises a temperature of the fuel cell stack from a subzero start-up commencement temperature while controlling at least one of a flow rate and pressure of a reaction gas that is introduced into the fuel cell stack, and at least one of an output current and output voltage of the fuel cell stack, wherein the start-up control device includes:

a temperature measuring device that measures a temperature of the membrane electrode assemblies;

a power generating mode determining device that determines whether start-up should be carried out in normal power generating mode or in low temperature staff-up power generating mode based on the temperature that has been measured by the temperature measuring device; and a low temperature start-up output control device that, when it is determined by the power generating mode determining device that staff-up should be conducted in the low temperature start-up power generating mode, controls outputs from the fuel cell stack such that the output current of the fuel cell stack is equal to or greater than a minimum necessary current that is required to compensate for discharged heat, and wherein when a temperature of the fuel cell stack is raised using self generated heat that is created as a result of the fuel cell stack generating power, a heat capacity of the fuel cell stack is set, based on a preset start-up commencement temperature and on characteristics of the membrane electrode assemblies, to a predetermined value such that a temperature of the membrane electrode assemblies is raised to 0° C. or more before the membrane electrode assemblies become unable to generate power.

20. The system of starting up a fuel cell stack at a subzero temperature according to claim 19, wherein a cross-sectional area of coolant flow passages in the fuel cell stack is smaller than a cross-sectional area of reaction gas flow passages.

21. The system of starting up a fuel cell stack at a subzero temperature according to claim 19, wherein, in the fuel cell stack, spaces that are formed between the membrane electrode assemblies and the separators form reaction gas flow passages, a portion of a plurality of spaces that are formed between the separators that have been placed adjacent to each other form coolant flow passages, and remaining spaces form air layers.

22. The system of starting up a fuel cell stack at a subzero temperature according to claim 19, wherein the fuel cell stack has first fluid flow passage portions that are formed by stacking a plurality of separators between membrane electrode assemblies that are adjacent to each other, and second fluid flow passage portions that are formed by placing a single separator between membrane electrode assemblies that are adjacent to each other, and in the first fluid flow passage portions and the second fluid flow passage portions spaces that are formed between the membrane electrode assemblies and the separators form reaction gas flow passages, and in the first fluid flow passage portions spaces that are formed between stacked separators form coolant flow passages.

23. A method of designing a fuel cell stack that is formed by stacking a plurality of layers of membrane electrode assemblies having a solid polymer electrolyte membrane and electrodes, and separators that are placed between adjacent membrane electrode assemblies, the method comprising:

setting a subzero temperature as a start-up commencement temperature;

calculating a limited time for start-up in which the membrane electrode assemblies are unable to generate power from the start-up commencement temperature and obtained current;

calculating a maximum heat capacity of the fuel cell stack from the start-up commencement temperature and the limited time for start-up; and designing a fuel cell stack such that metal separators having a cross-sectional waveform structure are used therein and the fuel cell stack has a lower heat capacity than the maximum heat capacity.

* * * * *